US012576696B1

(12) United States Patent
    Baker

(10) Patent No.: US 12,576,696 B1
(45) Date of Patent: Mar. 17, 2026

(54) AIR VENT ASSEMBLY AND CONTROL SYSTEM

(71) Applicant: Scott Baker, Sherman Oaks, CA (US)

(72) Inventor: Scott Baker, Sherman Oaks, CA (US)

( * ) Notice: Subject to any disclaimer, the term of this patent is extended or adjusted under 35 U.S.C. 154(b) by 644 days.

(21) Appl. No.: 17/567,021

(22) Filed: Dec. 31, 2021

Related U.S. Application Data

(63) Continuation-in-part of application No. 16/695,012, filed on Nov. 25, 2019, now Pat. No. 11,235,643.

(51) Int. Cl.
    *B60H 1/34* (2006.01)
    *B60H 1/00* (2006.01)

(52) U.S. Cl.
    CPC ....... *B60H 1/3428* (2013.01); *B60H 1/00757* (2013.01); *B60H 1/00807* (2013.01); *B60H 1/00864* (2013.01); *B60H 1/00871* (2013.01); *B60H 2001/3478* (2013.01)

(58) Field of Classification Search
    CPC .............. B60H 1/3428; B60H 1/00757; B60H 1/00807; B60H 1/00864; B60H 1/00817; B60H 2001/3478

USPC .......................................................... 454/154
See application file for complete search history.

(56) References Cited

U.S. PATENT DOCUMENTS

2016/0123621 A1* 5/2016 Perrie ...................... F24F 11/66
                                                    454/258
2016/0363336 A1* 12/2016 Roth ......................... F24F 11/62

* cited by examiner

*Primary Examiner* — Avinash A Savani

(57) ABSTRACT

An air vent control system comprises a directional air flow component mounted on a first axis within a first housing, and a second housing defining an inner space in which the first housing is mounted. A first motor moves the directional air flow component to an angular position within the first housing, and a second motor pivots the first housing contained within the second housing.

A front and rear opening allows air flow in a direction from the rear opening to the front opening. A main controller sets the angular position of the directional air flow component on the first axis, and the angular position of the first housing on the second axis. The respective positions of the directional air flow component relative to the first housing and the first housing relative to the second housing selectively regulate the direction of airflow discharged.

16 Claims, 48 Drawing Sheets

16

18

17

20

2

15

24

44

44

102

101

AIR VENT ASSEMBLY AND CONTROL SYSTEM

CROSS-REFERENCE TO RELATED APPLICATIONS

This application claims the benefit of U.S. Non-Provisional patent application Ser. No. 16/695,012 filed Nov. 25, 2019, the contents of which are incorporated.

BACKGROUND AND FIELD OF INVENTION

As automobiles have evolved over the decades many elements have changed, one of the biggest changes came in the 1960's with the advent of air conditioning . . . of course earlier systems where in place however those were more of a swamp cooler system adapted to a vehicle with air being directed over ice in a tube.

When the "closed system" air conditioning system was introduced into vehicles it had several components, the one that has changed the least in all the following decades is the interior vent that directs the air to where the driver and passenger desire it. A simple grille that can be moved from side to side and up and down covering a wide range of directions the cool air can travel.

The adjusting of these vents is more on topic of what has not changed, a person lifts their hand to the vent control lever and adjusts the position of the vent then lowers their hand from in front of the vented air pathway to see if the adjustment was what was desired. Most of the time several adjustments are needed since the person's hand and arm are always blocking the air flow while the adjustment is being done. Not only is this a time consuming event it can also be a safety hazard as each time the person looks to the vent when they reach for it, they are not watching the road.

There has long been a need for a way to adjust an air conditioning vent remotely, allowing the path of cooled air from the vent to the person to be clear of any obstacles while the vent is being adjusted. This function would allow for a much safer and effective and efficient process allowing the driver to maintain focus on the road as the cool air on their skin would direct the adjustments needed.

Additionally, there are other areas in life where being able to circulate stagnant air or warm air would be beneficial, areas such as dog houses, shower stalls, closets etc.

SUMMARY OF INVENTION

The invention currently defined is a remotely controlled vent for a vehicular air conditioning system.

A/C vents available in vehicles today require multiple adjustments to get the air directed exactly where the person desires it, this is because the action taken to adjust the vent requires the person to have their hand and arm in such a position that it blocks the air flow to the person, thus the person does not know where the air is going until they move their hand and arm from in front of the vent they just adjusted . . . This is a repeatable action until the air flow direction is close enough to what is wanted.

The current invention allows the enjoyer of the A/C to merely place their hand on a knob or other type of positional indication type of feature, such as a joystick or a mouse ball for example.

By moving the joystick in a myriad of directions the vent can move up and down and from side to side as well as every combination of those two intersecting directions, something made possible by the electronics and computer coding written to direct multiple motors to move in concert with each other allowing for a wide range of air flow directional options.

This remote system allows the driver to keep their eyes on the road while adjusting the joystick and when the air hits them where they want, they stop adjusting, using the air contacting the skin to direct the vent to the desired location.

This invention allows for a main control panel that has individual preset locations as well as group presets for all the vents in a vehicle and also allows for a secondary control panel for the passenger to operate the vents affecting them. This invention allows for vents of all shapes and sizes, from square to rectangular to round, as well as utilizing a digital format to run the operation. In one embodiment the directional controller is just like a trackball mouse that moves the vent as directed by the user rolling the ball around in its cradle.

There are many ways the control panel can be configured, many operations the control panel can offer, and many ways the directional mechanism can be designed. The commonality in purpose is remotely adjusting a vehicular air conditioning vent. While the design of each of the required components can be of varied shapes and sizes the functionality remains consistent in allowing a vehicular air conditioning vent to be adjusted without touching the actual vent itself. This invention can also be configured to accommodate multiple rows of seating in larger vehicles.

Additionally, making this general technology available to control stagnant air in dog houses would create a healthier environment for pets. Moving trapped hot air in shower stalls while in use would reduce the potential for moisture damage or mold developing. Eliminating trapped hot air in closets would benefit the longevity of fabrics as well as keeping stale odor from becoming embedded in the material.

DETAILED DESCRIPTION OF THE DRAWINGS

Reference is now made to the various drawings accompanying this specification which shows two preferred embodiments of the invention. While the embodiments illustrated show different views and perspectives of the invention, the invention is not limited to the specific details and configurations.

Figure 1:
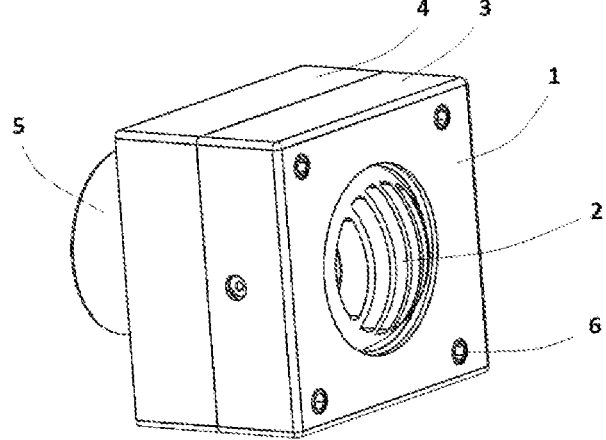
FIG. 1 Front ¾ view of the current invention, an air conditioner (a/c) vent assembly.

FIG. 1 In 3/4 front side view shows an air conditioning (a/c) vent assembly 1 with a ball shaped vent 2 held within a front housing 3 and a rear housing 4, the front and rear housings held together with a plurality of bolts 6, the rear housing 4 having a protruding neck 5 for the intaking of air.

Figure 2:
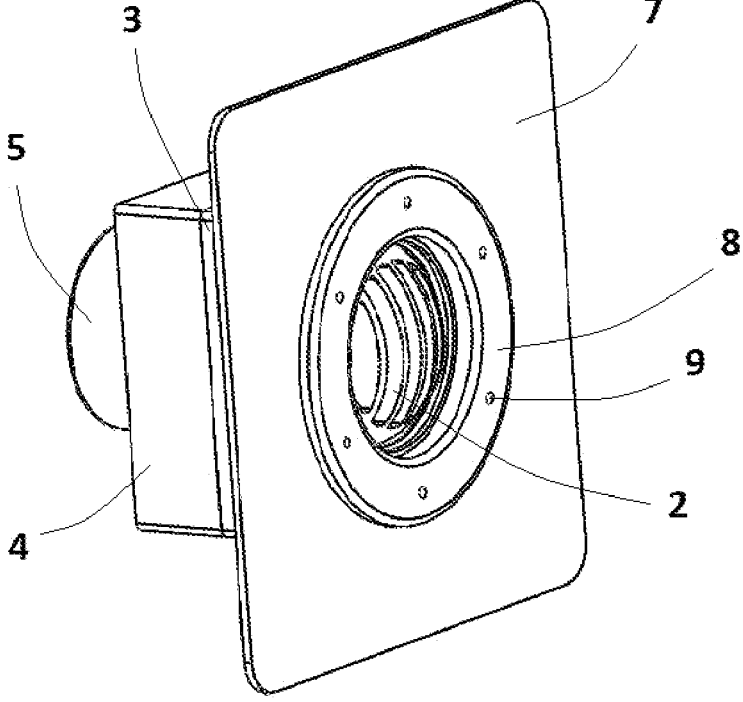
FIG. 2 Front ¾ view of the current invention installed in a mounting panel similar to an automotive dash panel, secured with a face plate.

FIG. 2 In ⅝ front side view an a/c vent assembly as detailed in FIG. 1 additionally detailing a mounting plate 7 similar to a vehicles dash panel, a securement face ring 8 to attach the vent component to a dash panel, and a plurality of face ring screws 9, when combined allowing the a/c vent assembly to be mounted in different locations.

Figure 3:
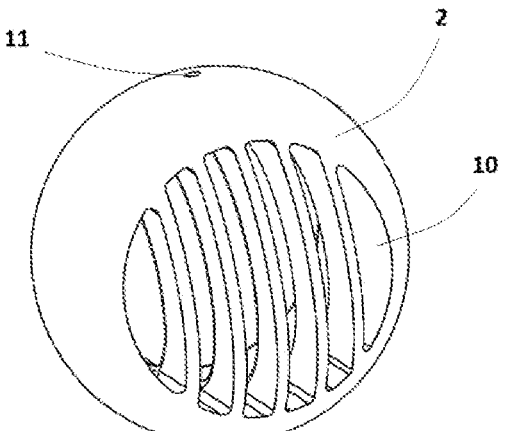
FIG. 3 Slight off-center front view of a "ball" shaped a/c vent with air flow slots integrated.

FIG. 3 Shown in slightly off-center front view is a ball shaped vent 2 with a multitude of vent slots 10 integrated for allowing air to pass through, a top hole 11 is shown for housing a rotating pivot pin.

Figure 4:
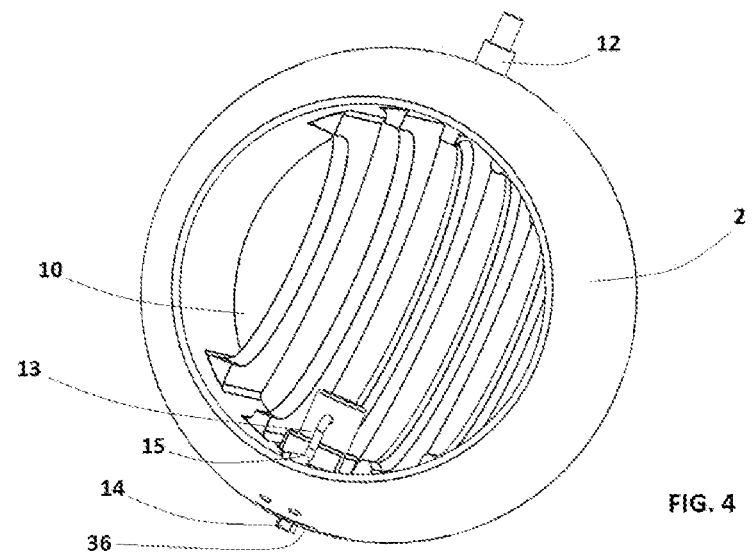
FIG. 4 Slightly off-center rear view of a "ball" shaped a/c vent with a pivot post and a rotational motor installed.

FIG. 4 In slightly off-center rear view shows a ball shaped a/c vent 2 with an upper rotational pivot pin 12 installed, a plurality of air flow slots 10 in the ball shaped vent 2, a rotational motor 13 with a wiring harness 15, a motor drive shaft 14 protruding from the bottom of the vent ball 2 and a motor access mounting plate 36.

Figure 5:
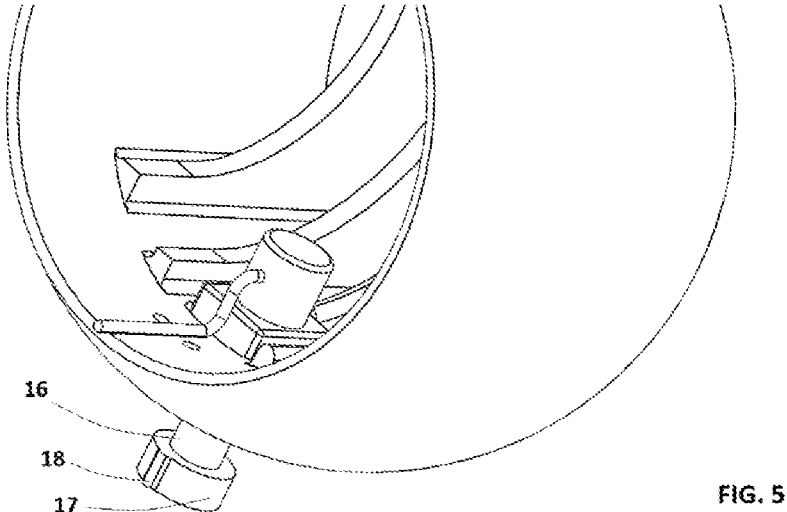
FIG. 5 Closeup ¾ side rear view of a "ball" shaped a/c vent detailing a lower pivot pin to a motor locking mechanism.

FIG. 5 In similar view to FIG. 4 a motor drive shaft collar 16 attaches to the motor drive shaft 14 and has a shoulder 17 and a lock bump 18.

Figure 6:
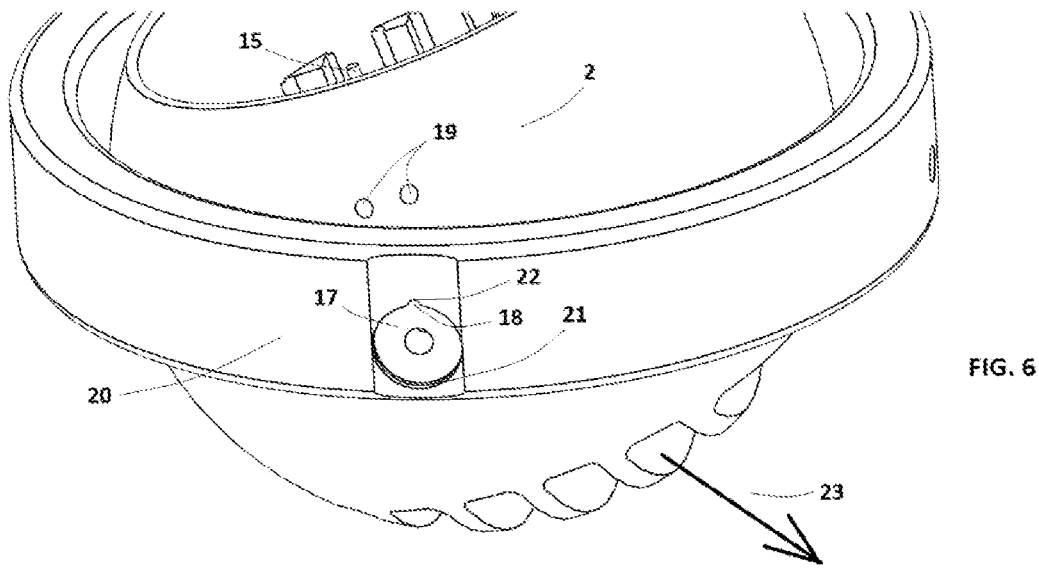
FIG. 6 Slightly off-center bottom view of a "ball" shaped a/c vent detailing the FIG. 5 locking mechanism installed in an outer pivot ring.

FIG. 6 Shown in slightly angled bottom view is the ball vent 2 with a plurality of motor cover mounting holes 19. An outer ring 20 now supports the ball vent 2 with the upper pivot pin 12 (not shown) and the motor drive shaft collar shoulder 17 attached to the motor drive shaft 14 and secured in a recess 21, the recess 21 having an additional lock bump recess 22 for accommodating the lock bump 18. With the lock bump 18 engaged in the lock bump recess 22 and the rotational motor 13 secured in the ball vent 2, when the motor 13 is activated to turn the motor drive shaft 14 in either direction the ball vent 2 will rotate within the outer ring 20 or the outer ring 20 will rotate around the ball vent 2, however, once the outer ring 20 is itself secured within the front housing (not shown) the rotational motion initiated by the rotational motor 13 will cause the ball vent 2 to rotate within the outer ring 20 a selectable amount of degrees to the left or to the right, as will be further detailed in following Figures. Ball vent 2 is pointing to the right as indicated by an arrow 23.

Figure 7:
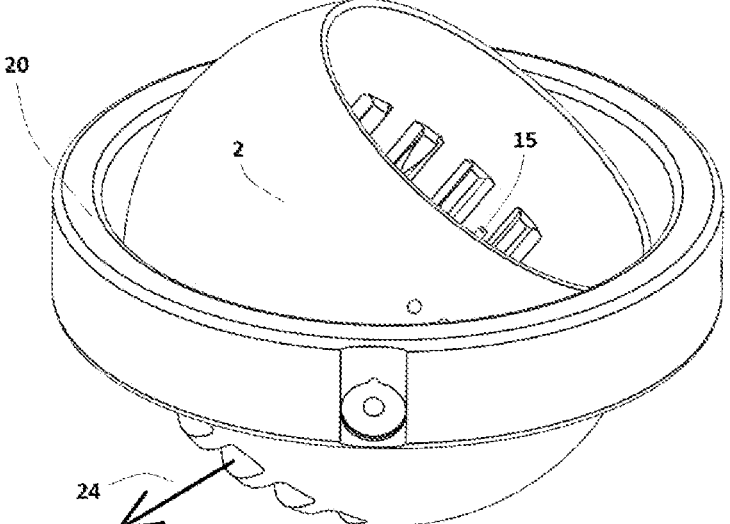
FIG. 7 ¾ bottom rear view of a ball shaped a/c vent installed in a circular outer pivot ring, the rear of the ball a/c vent rotated to the right.

FIG. 7 Similar to FIG. 6 showing ball vent 2 mounted in outer ring 20 and pointed to the left as indicated by an arrow 24.

Figure 8:
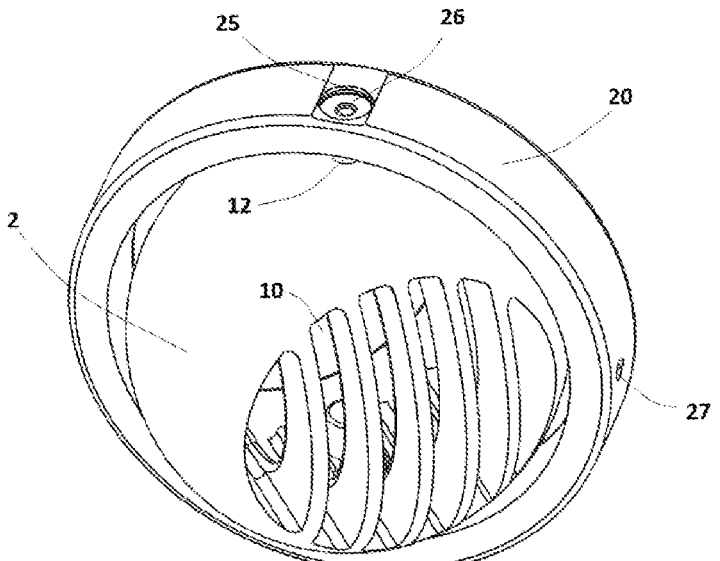
FIG. 8 ¾ top front view of FIG. 7 detailing an upper pivot pin connecting the ball a/c vent to the outer ring and showing the front of the ball vent rotated towards the right.

FIG. 8 Shown in slightly tipped top view, the ball vent 2 rotatably secured within the outer ring 20, detailing the top pivot pin 12 within a bearing 26 which is secured within a recess 25. Outer ring 20 showing a ring rotational post hole 27. The ball vent 2 is pointed to the right as indicated by the vent slots 10.

Figure 9:
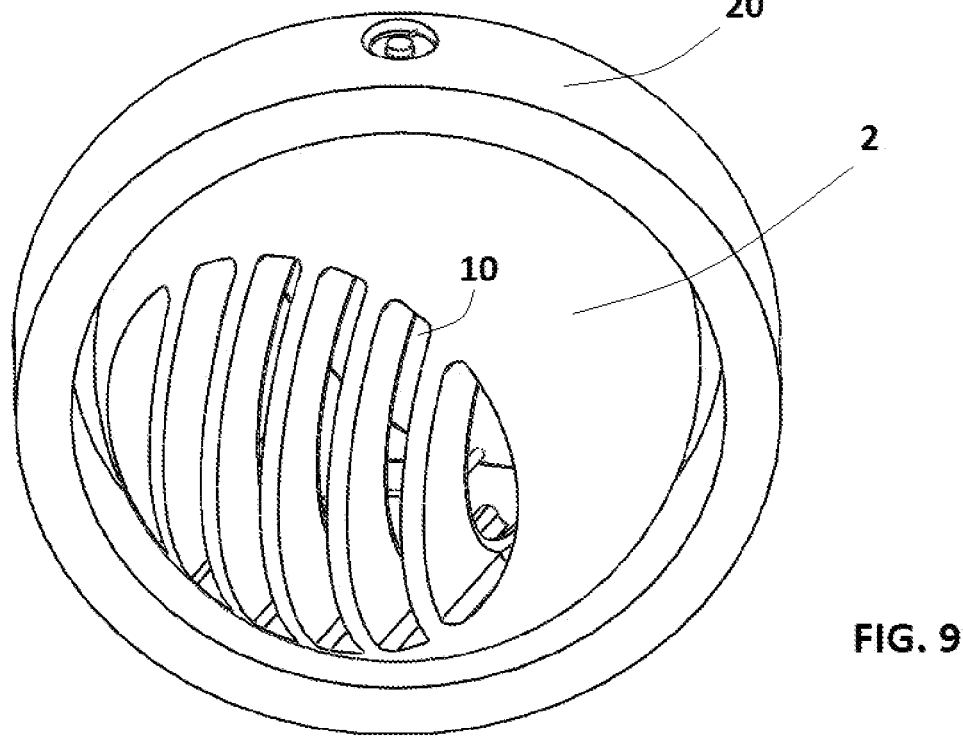
FIG. 9 ¾ top front view of FIG. 7 detailing an upper pivot pin connecting the ball a/c vent to the outer ring and showing the ball vent rotated towards the left.

FIG. 9 Similar to FIG. 8 except the ball vent 2 is pointed towards the left as indicated by the vent slots 10.

Figure 10:
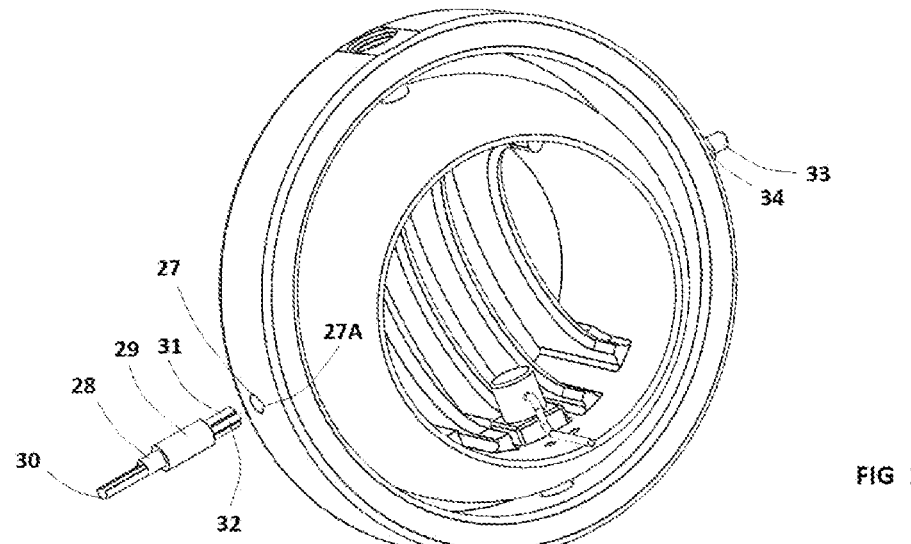
FIG. 10 ¾ rear view of a ball shaped vent and an outer pivot ring, showing the pivot pins at top and bottom of the ball inset into the ring, a pivot pin inset in the outer right side of the outer ring and showing the details of a pivot pin for the left side of the outer ring.

FIG. 10 Angled rear view of ball vent mounted in the outer ring, a ring rotational post 33 with a bearing shoulder 34 secured within the outer ring, a ring rotational locking post 28 with a bearing shoulder 29, a ring insert extrusion 31, a locking bump 32, and a locking post to motor keyway extrusion 30. The ring insert extrusion 31 insets into the outer ring rotational post hole 27 and the locking bump 32 engages and locks into the outer ring rotational post hole lock 27A, the outer ring will pivot rotationally around the axis the locking post 28 creates, that rotational movement caused by computer input direction given to the rotational motor that is mounted in the front housing.

Figure 11:
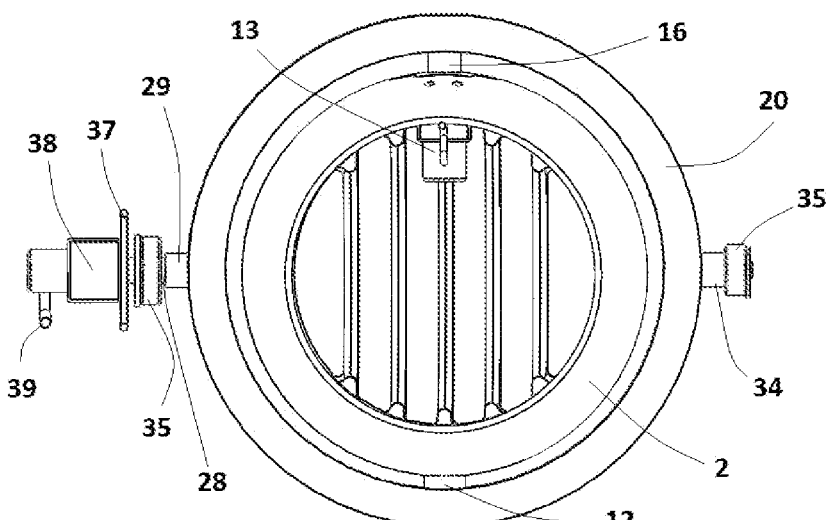
FIG. 11 Shown in rear view with a front and a rear housing which all the components mount into not present, a right-side outer ring post shown into a bearing while a left side outer ring post connects the outer ring to a rotational motor through a bearing.

FIG. 11 Shown in front view, the a/c vent assembly without the front and rear housings. The ball vent 2 rotatably mounted in the outer ring 20 by means of the rotational pivot pin 12 and the motor driveshaft collar 16 both on a vertical plane. The outer ring 20 with a ring rotational post 33 on a horizontal plane with a bearing 35 mounted upon it and having a ring rotational post shoulder 34 exposed. The ring rotational locking post 28 inserted into a bearing 35 and the ring rotational locking post shoulder 29 exposed and also on a horizontal plane being installed into the outer ring on one end and connected to a rotational motor 38 on the other, a wiring harness 39 is detailed as well as a rotational motor mounting plate 37. The motor mounting plate 37 attaches to the motor 38 and then attaches to the front housing (not shown). When mounted in the front housing and activated, the motor drive shaft which the motor itself rotates internally rotates the outer ring moving the top of the ring a selectable amount of degree forward as well as backward, as will be shown in further figures.

Figure 12:
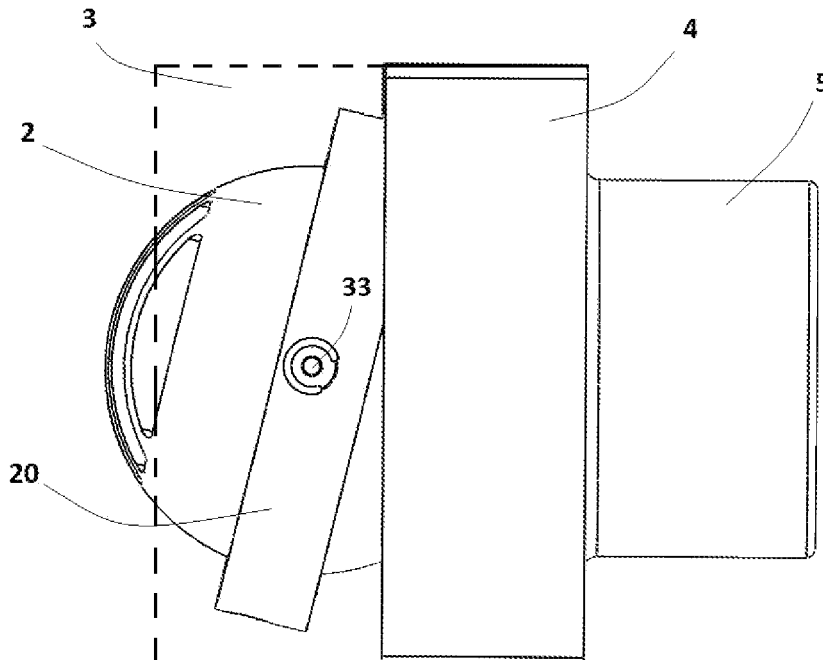
FIG. 12 In side view with a rear housing shown solid, a front housing shown in transparent format detailing the outer ring with its top edge rotated back and its bottom edge rotated forward directing the ball vent held within the transparent front housing to be directing air at an upward angle.

FIG. 12 In side view with the front housing 3 in transparent format showing the outer ring 20 rotated so the top portion is angled backwards towards the rear housing 4, this rotation causing the ball vent 2 to direct air flow upward as the air passes through it. The ring rotational post 33 acting as the axis point for rotation.

Figure 13:
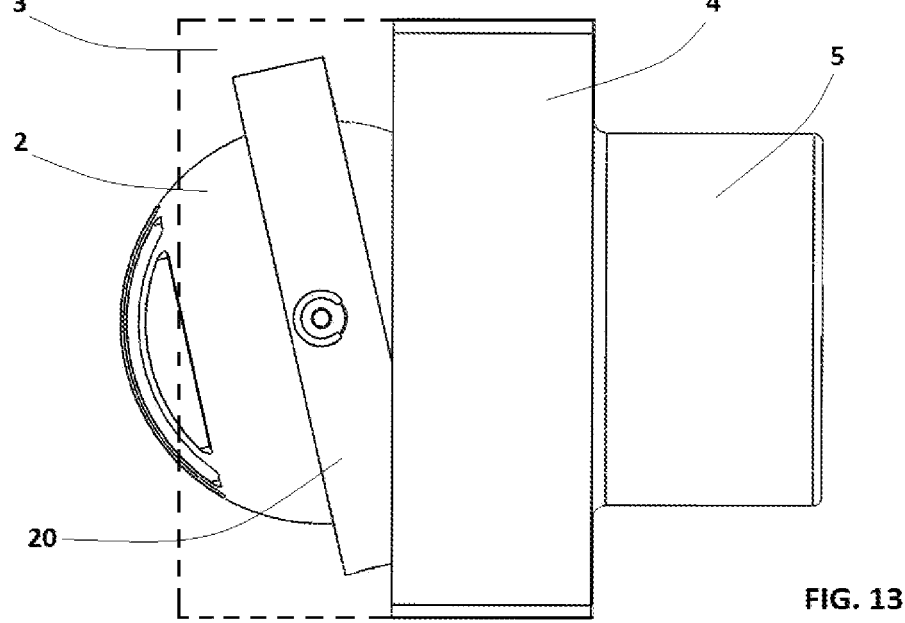
FIG. 13 In side view with a rear housing shown solid, a front housing shown in transparent format detailing the outer ring with its top edge rotated forward and its bottom edge rotated back directing the ball vent held within the transparent front housing to be directing air at a downward angle.

FIG. 13 In side view with the front housing 3 in transparent format showing the outer ring 20 rotated so the top portion is angled forward, away from the rear housing 4, this rotation causing the ball vent 2 to direct air flow downward as the air passes through it. The ring rotational post 33 acting as the axis point for rotation.

Figure 14:
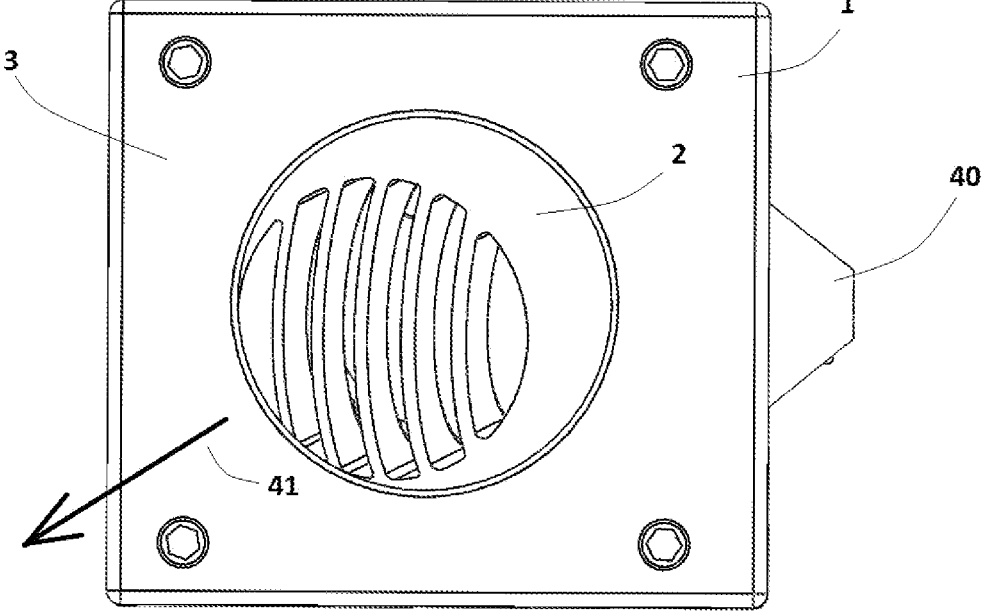
FIG. 14 Front view of the complete a/c vent component from FIG. 1 showing the ball vent directing air flow down and to the left by utilizing the rotational function abilities between the ball vent and the outer ring combined with the rotational function abilities between the outer ring and the front housing.

FIG. 14 Front view of a/c vent assembly 1 showing the ball vent 2 directing air flow downward and to the left as indicated by an arrow 41, this angle accomplished by combining the rotational movement capabilities of the ball vent 2 within the outer ring 20, and the outer ring 20 within the front housing 3. An outer ring motor cover 40 attached to the front housing 3 is also shown.

Figure 15:
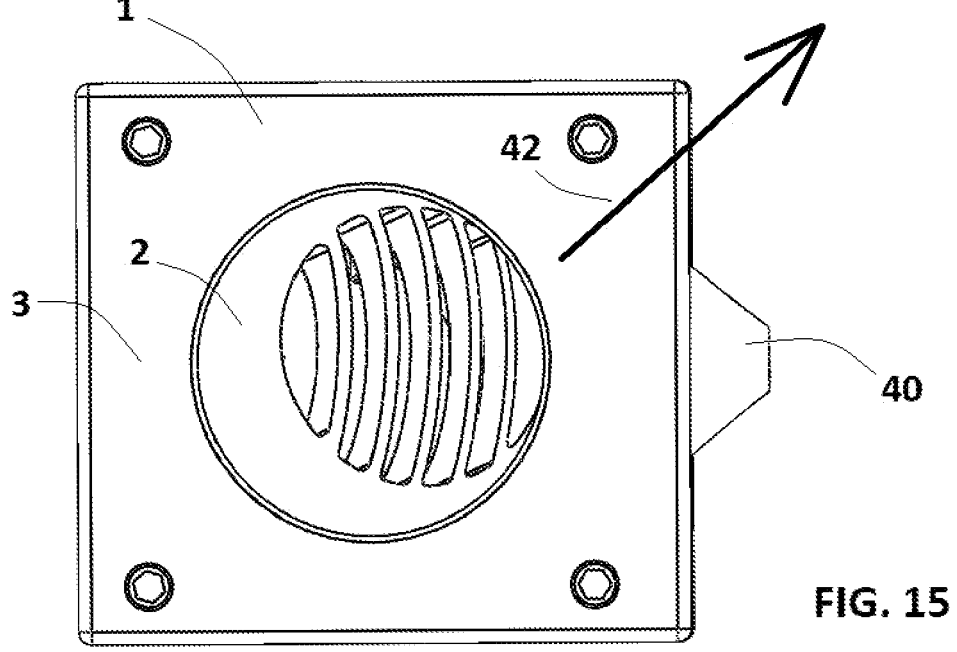
FIG. 15 Front view of complete a/c vent component from FIG. 1 showing the ball vent directing air flow up and to the right by utilizing the rotational function abilities between the ball vent and the outer ring combined with the rotational function abilities between the outer ring and the front housing.

FIG. 15 Front view of a/c vent assembly 1 showing the ball vent 2 directing air flow upward and to the right as indicated by an arrow 42, this angle accomplished by combining the rotational movement capabilities of the ball vent 2 within the outer ring 20 and the outer ring 20 within the front housing 3. An outer ring motor cover 40 attached to the front housing 3 is also shown.

Figure 16:
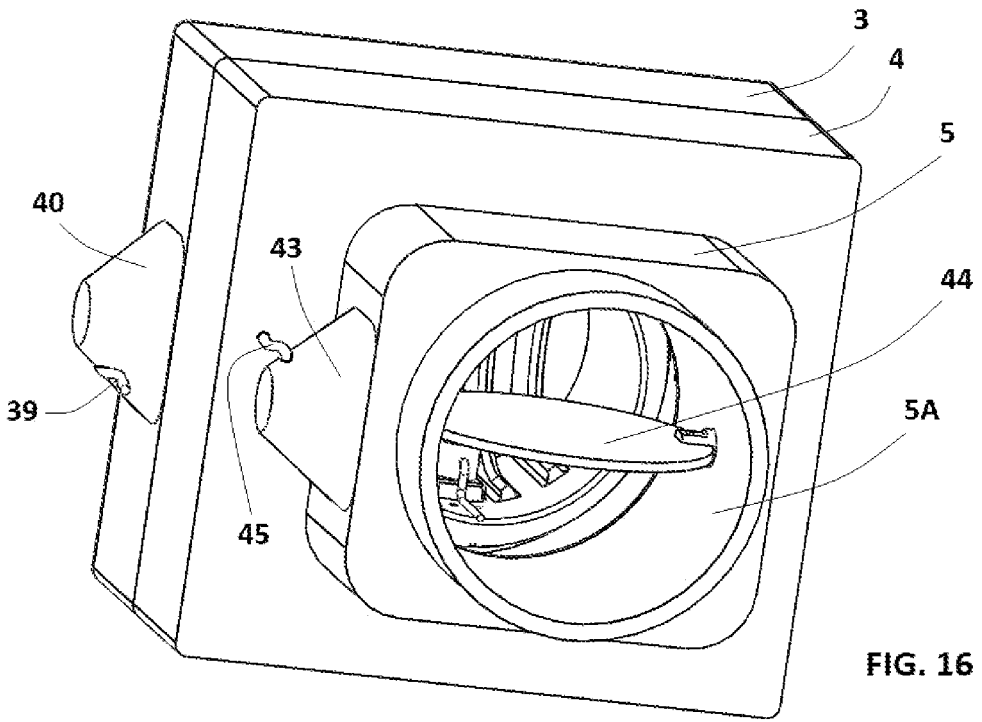
FIG. 16 Slightly off-center rear view showing an air flow control flap inside the extended inlet of the rear housing, the air flow control flap shown in the open position.

FIG. 16 Slightly tilted rear view of a/c vent assembly showing an air inlet area 5A which houses an air volume flap 44 that regulates the amount of air allowed to pass through the vent assembly. A rotational motor that adjusts the flap 44 through a multiple of angle options allowing only as much air to pass through as desired by operator, and is covered by a motor cover 43 and given power by a wiring harness 45. The air volume flap 44 shown in the wide-open position.

Figure 17:
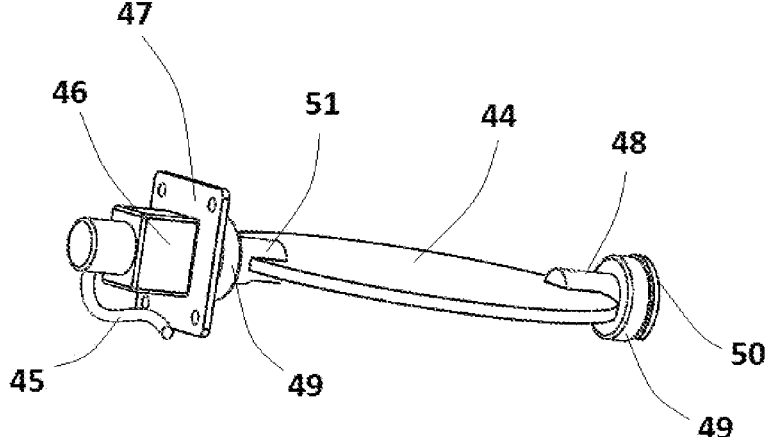
FIG. 17 Showing the same angle as FIG. 16 with the front and rear housings with all their internal components removed, the airflow control flap is detailed between a pair of pivot pins, those pins each stabilized through a bearing, one pivot pin attached to a rotational motor. The flap shown in the open position.

FIG. 17 Similar to FIG. 16 with the front and rear housing and all the internal components housed within them removed, only the air volume flap 44 and its direct components are shown. The air volume flap 44 held between a flap to housing rotation post 48 and a flap to motor shaft post 51, both post 48 and post 51 rotate within a pair of bearings 49 which are securably mounted within the rear air inlet 5 of the rear housing 4 by a pair of retaining clips 50. A motor plate 47 secures a rotational motor 46 to the rear air inlet 5 of the rear housing 4. Air volume flap is shown in wide open position.

Figure 18:
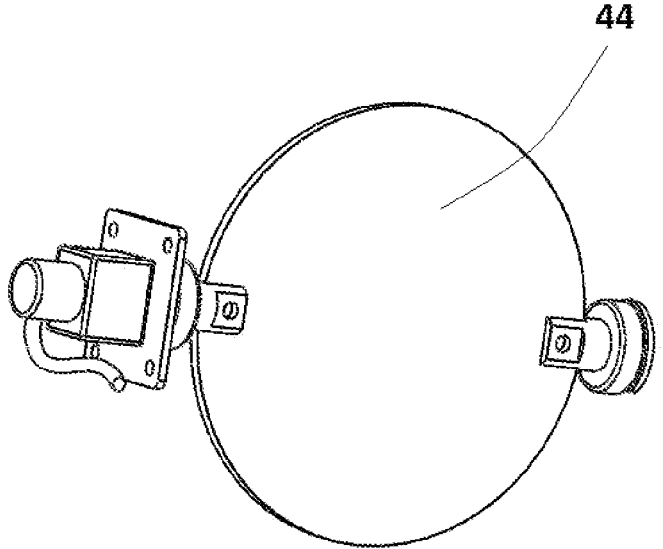
FIG. 18 Same components as FIG. 17, except the flap is in the closed position.

FIG. 18 Similar to FIG. 18 except the air volume flap 44 is in the completely closed position.

Figure 19:
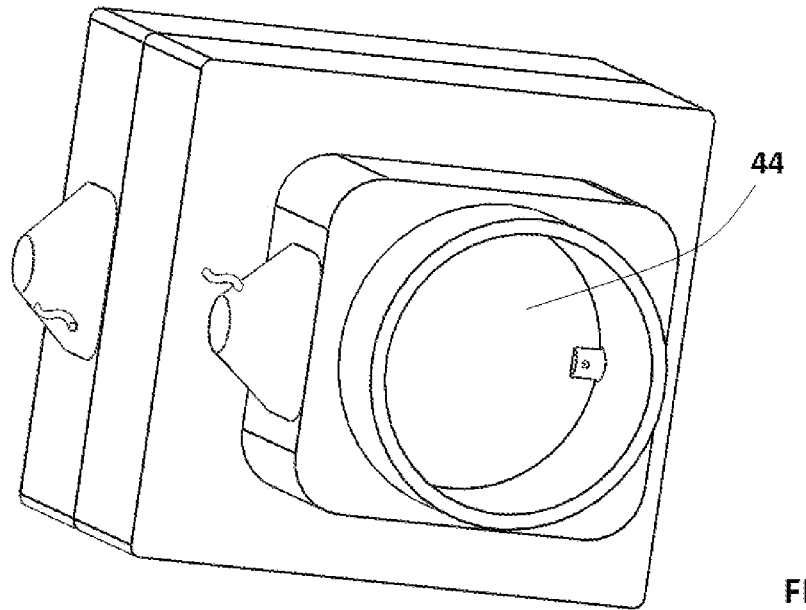
FIG. 19 Same as FIG. 16 except the flap is shown in the closed position.

FIG. 19 Similar to FIG. 16 except the air volume flap 44 is in the completely closed position.

Figure 20:
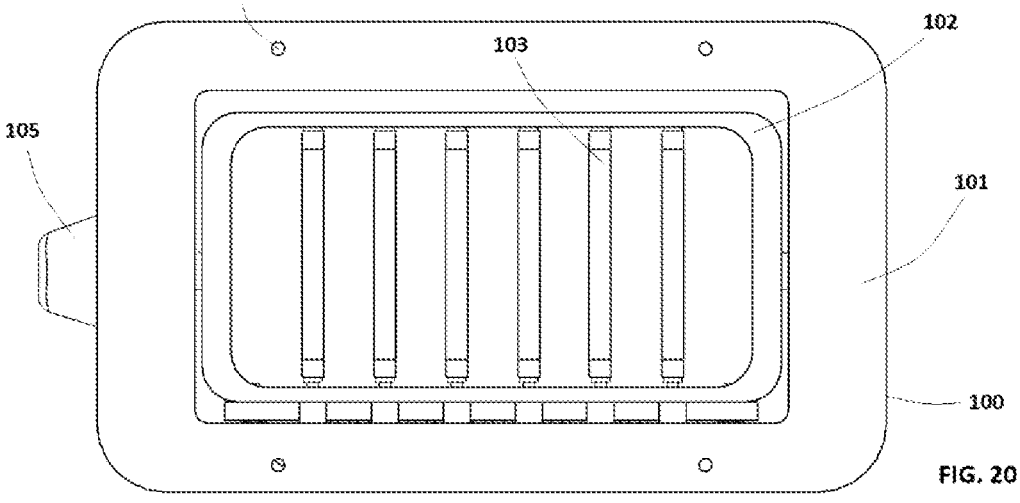
FIG. 20 Front view of a different embodiment of the current invention, that being a rectangular shaped air conditioning vent with a plurality of moveable vent slats.

FIG. 20 In another embodiment of the current invention, a rectangular shaped air conditioning vent assembly 100 with an outer housing 101, an inner housing 102, a plurality of vent slats 103, a plurality of assembly mounting holes 106, and an outer housing rotational motor cover 105.

Figure 21:
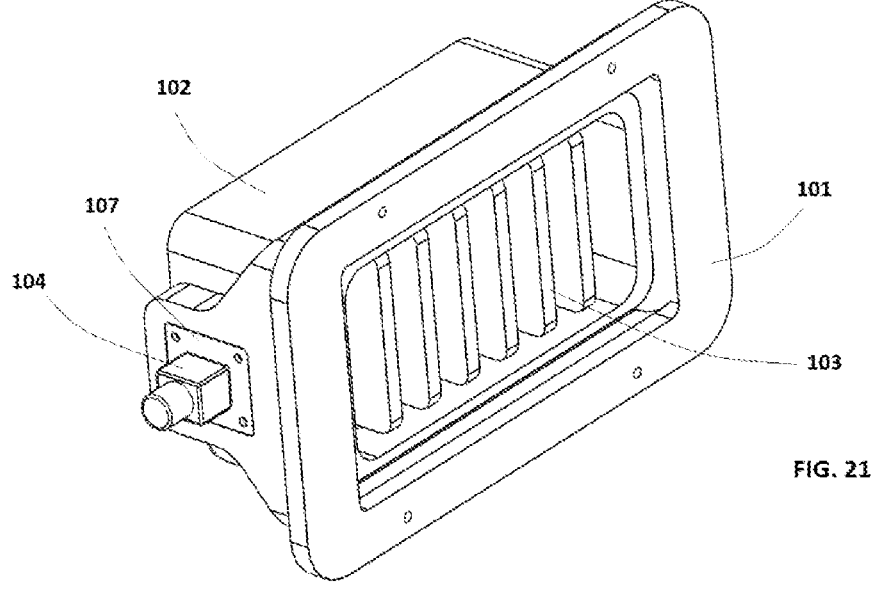
FIG. 21 Shown in top front side view angle, the same embodiment as in FIG. 20.

FIG. 21 In ⅜ front top side view detailing the outer housing 101, the inner housing 102, a rotational motor 104, and a rotational motor mounting plate 107.

Figure 22:
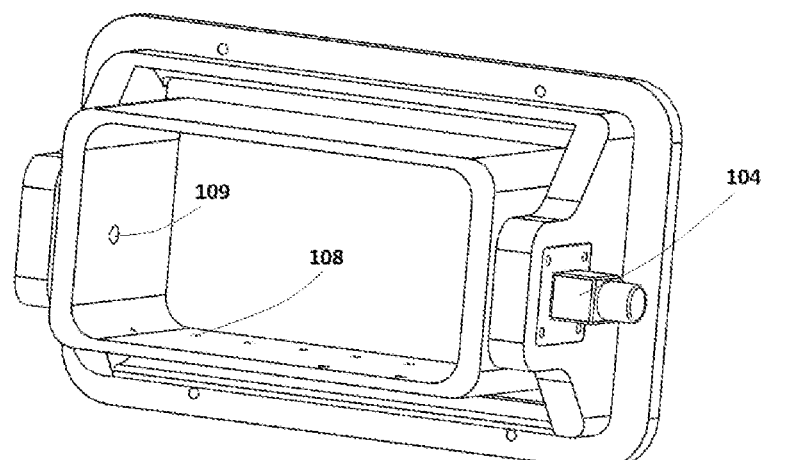
FIG. 22 Shown in ¾ rear side view with vent slats removed.

FIG. 22 In slightly offset rear view with the vent slats 103 removed and detailing a plurality of lower vent slat mounting holes 108, a rotational locking pivot post 109, and the rotational motor 104.

Figure 23:
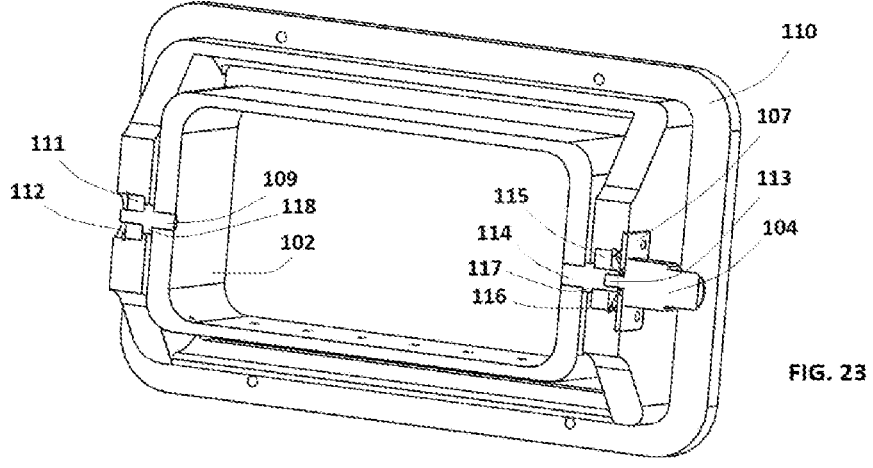
FIG. 23 Shown in ¾ rear side cut-away view exposing rotational components and a rotational motor.

FIG. 23 Same view angle as FIG. 22 in cut-away view detailing the rotational components required to rotate the inner housing 102 within the outer housing 101. The rotational motor 104 mounted to the motor plate 107 which is mounted to the outer housing 101. A motor drive shaft 113 is engaged and locked internally to a drive shaft pivot shaft 114 which is secured within a bearing 115, the bearing 115 which is retained within the outer housing 101 and secured with a retaining clip 116. The drive shaft pivot post 114 having a shoulder section 117 maintaining a set distance between the inner and outer housings and being locked into the inner housing 102. The rotational pivot post 109 secured in the inner housing 102 and partially residing in a bearing 111, the bearing 111 locked within the outer housing 101 by a retaining clip 112. A rotational pivot pin 109 having a shoulder section 118 maintaining a set distance between the inner and outer housings. When the rotational motor 104 is given directional instructions via a control panel component it turns the motor drive shaft 113 which turns the drive shaft pivot post 114 which rotates the inner housing 102 in a manner that points the direction of the overall air flow in and upward or downward direction. The rotational motor having the ability to offer a multitude of stopping positions or angles to direct the air flow from the maximum upward position capability of the vent assembly to the maximum downward position capability of the vent assembly, position change requests being directed to a controller that relays information from user moving the actual control "joystick" or "mouse ball" to the rotational motor, thus relaying the users request for a change in the direction of the air flow to the vent assembly itself.

Figure 24:
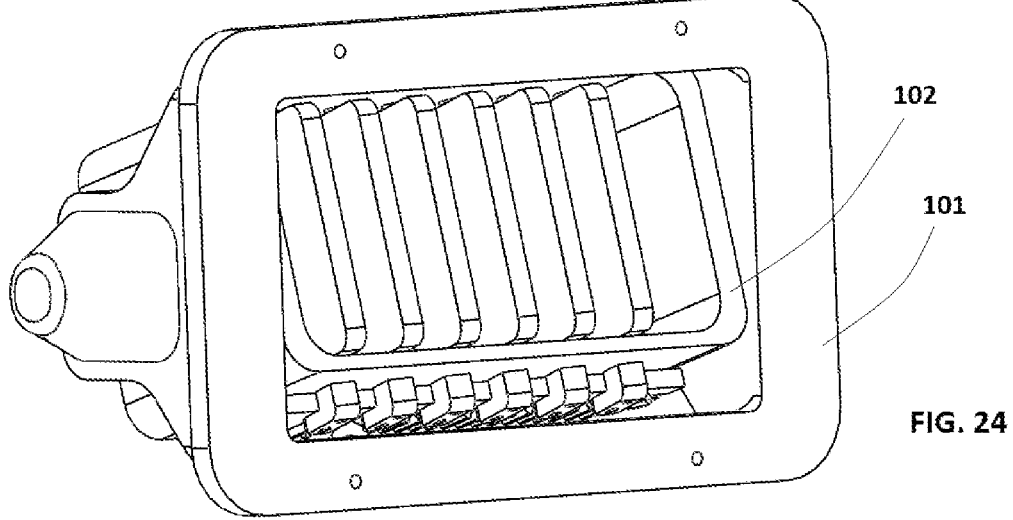
FIG. 24 Detailed in front side ¾ view with the vent slots in a forward position and directing the air flow in an upward angle.

FIG. 24 In front side ¾ view showing the inner housing 102 having been rotated by the rotational motor 104 (not exposed) within the outer housing 101 to direct air flow in an upward angle.

Figure 25:
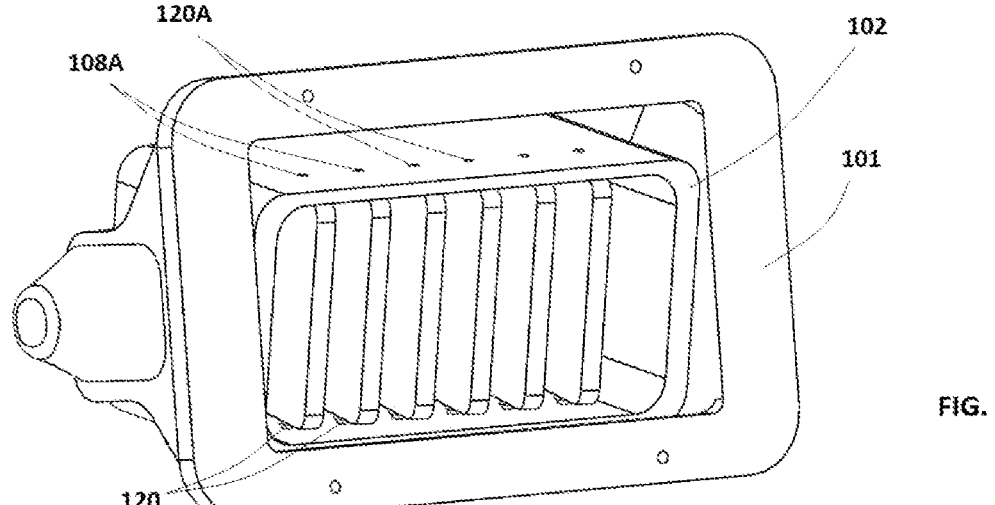
FIG. 25 Detailed in front side ¾ view with the vent slots in a forward position and directing the air flow in a downward angle.

FIG. 25 In front side ¾ view showing the inner housing 102 having been rotated by the rotational motor 104 (not exposed) within the outer housing 101 to direct air flow in a downward angle. A plurality of vent slat lower posts 120, vent slat upper posts 120A and vent slat upper mounting post holes 108A are also shown.

Figure 26:
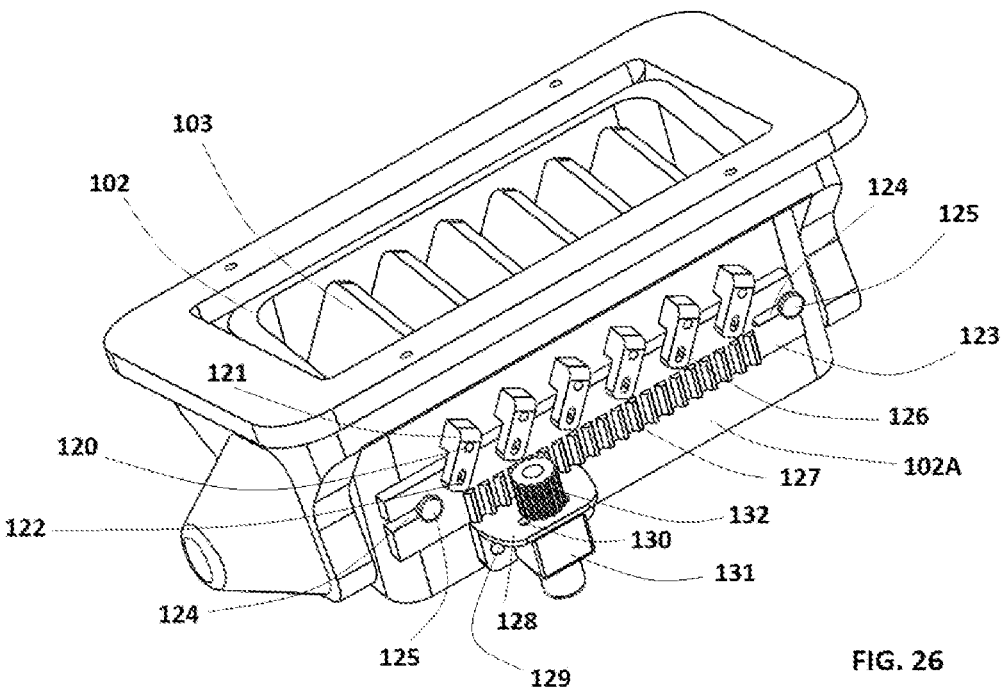
FIG. 26 In bottom front ¾ view exposing the components that move the vent slats from left to right.

FIG. 26 Shown in side front and rear angled view, the outer housing 101, containing the inner housing 102, containing the vent slats 103. Detailed on the bottom side of the inner housing 102 is the complete mechanics that move the vents slats 103 through their range of motion from directing the air flow to the left to directing air flow to the right. An inner housing motor plate 128 is mounted to the bottom side 102A of the inner housing 102 by a pair of mounting screws 129, an inner housing rotational motor 131 is mounted to motor plate 128 by a pair of mounting screws 130, the motor 131 has a driveshaft which rotates in clockwise and counterclockwise rotations as directed by inputs from the computer via a "joystick stick" "mouse ball" type directional input device, the driveshaft has a gear 132 secured to it. The gear 132 engages a gear rack 123 which slides across the bottom surface 102A of the inner panel 102 and is moveably secured with limited range of movement between a pair of gear alignment posts 125 which engage a pair of gear rack alignment slots 124. There is a plurality of vent slat pivot arms 121, each lower vent slat mounting post 120 having one vent slat pivot arm 121 attached to it. The gear rack 123 having a multitude of directional posts 126, each post 126 being secured at one end to the gear rack 123, the opposite end of each directional post 126 resides freely inside a pivot arm slot 122, each pivot arm 121 containing a pivot arm slot 122. When the rotational motor 131 receives a request from the computer it rotates the driveshaft which rotates the gear 132 which moves the gear rack 123, the gear rack 123 moving from one position to another changes the angle of the pivot arms 121 by the gear rack directional posts 126 leading the pivot arms 121 through moveable engagement with the pivot arm slots 122. The pivot arms 121 being moved by the gear rack directional posts 126 cause the vent slats 103 to change direction as the pivot arms 121 are securely fastened to the vent slats lower mounting posts 120.

Figure 27:
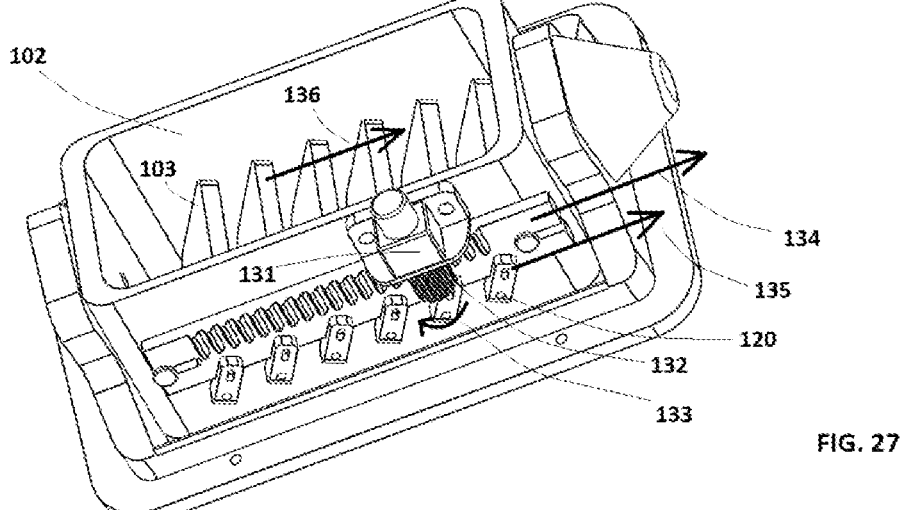
FIG. 27 In bottom front ¾ view exposing the components that move the vent slats from left to right, additionally the directions the specific components move to move the vent slats towards the right.

FIG. 27 Shown in back rear view the a/c vent assembly detailing the motion that occurs when the rotational motor gear 132 turns in a clockwise rotation as indicated by an arrow 133, this rotation of the gear 132 engaging the gear rack 123 causing the gear rack to the move to the right as indicated by an arrow 134 causing the pivot arms 121 to pivot to the right as indicated by an arrow 135, the pivot arms 121 secured on the lower vent slat mounting posts 120 causing the vent slats 103 to also turn to the right as indicated by an arrow 136, which directs the air flow in that direction.

Figure 28:
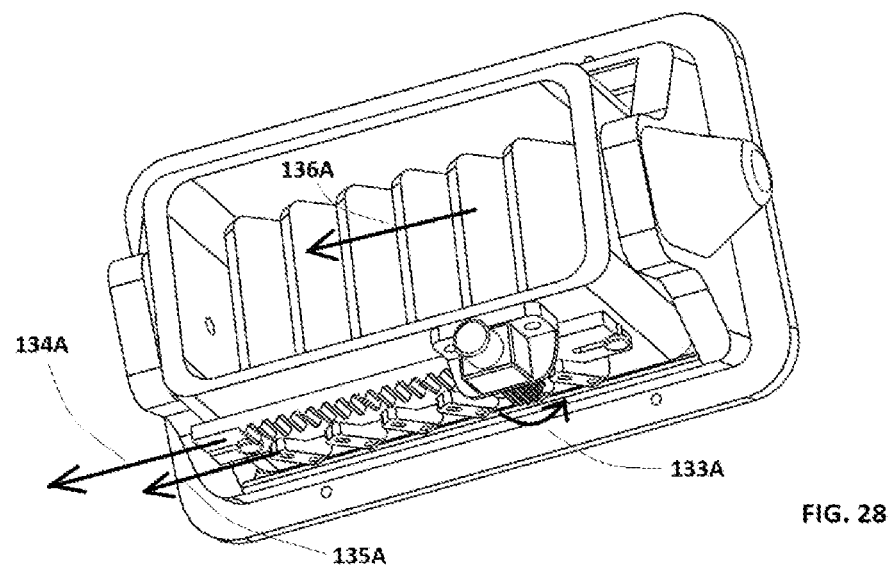
FIG. 28 In bottom front ¾ view exposing the components that move the vent slats from left to right, additionally the directions the specific components move to move the vent slats towards the left.

FIG. 28 Shown in back rear view the vent assembly detailing the motion that occurs when the rotational motor gear 132 turns in a counterclockwise rotation as indicated by an arrow 133A, this rotation of the gear 132 engaging the gear rack 123 causing the gear rack to move to the left as indicated by an arrow 134A causing the pivot arms 121 to pivot to the left as indicated by an arrow 135A, the pivot arms 121 secured on the lower vent slat mounting post 120 causing the vent slats 103 to also turn to the left as indicated by an arrow 136A, which directs the air flow in that direction.

Figure 29:
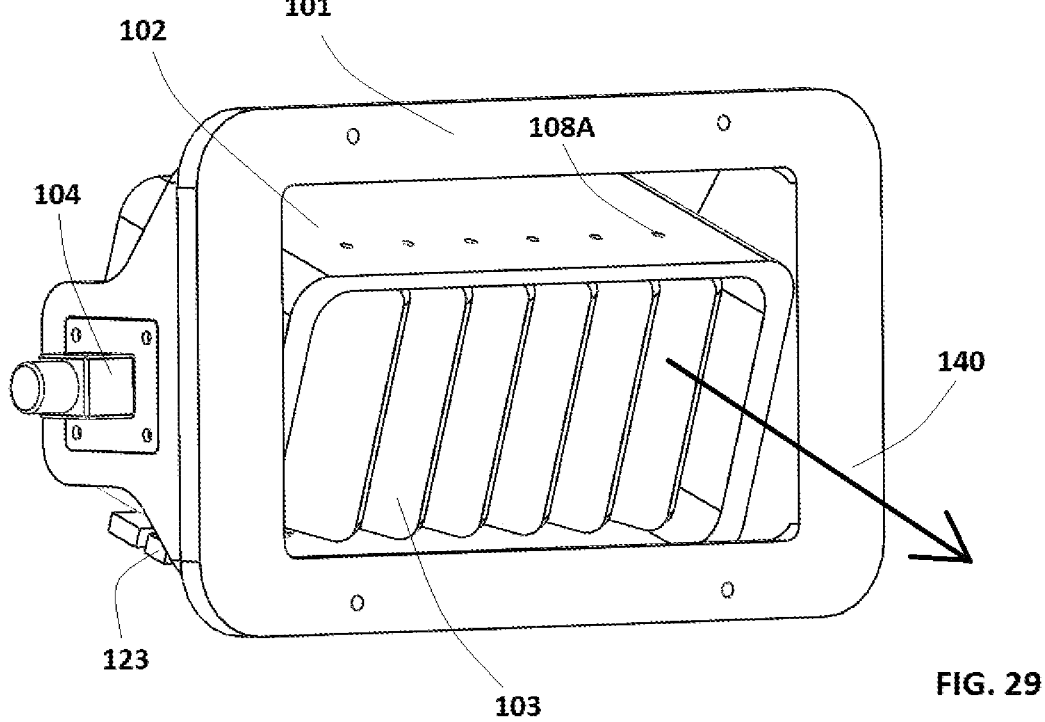
FIG. 29 Shown in slightly offset front view showing the vents slats in a position to direct the airflow downward and towards the right.

FIG. 29 Shown in front side view, the current embodiment with the outer housing 101 in a typical mounted position. The air flow being directed in a downward and to the right angle as indicated by an arrow 140, this angle of air flow position being produced when the outer housing motor and the inner housing motor are directed to move in combination with each other. Combining the upward and downward movement ability of the inner housing 102 motivated by the outer housing motor, with the left to right and right to left movement ability of the vent slats motivated by the inner housing motor affords air flow direction to cover the entire range from 12 o'clock being center upward to 1 o'clock, 2 o'clock, 3 o'clock, 6 o'clock being center downward all the way around the "dial" until back to 12 o'clock.

Figure 30:
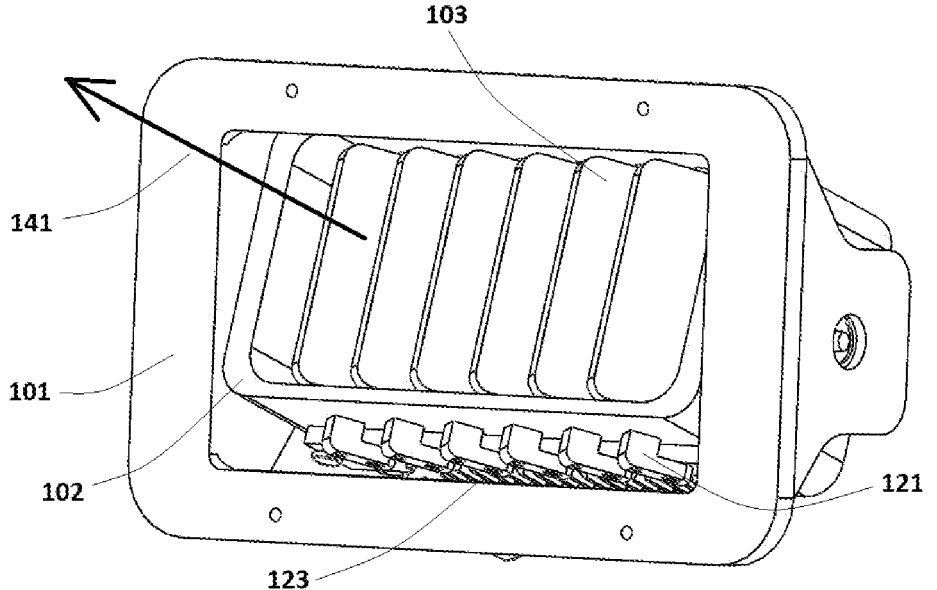
FIG. 30 Shown in slightly offset front view showing the vents slats in a position to direct the airflow upward and towards the left.

FIG. 30 Shown in front side view, the current embodiment with the outer housing 101 in a typical mounted position. The air flow being directed in an upward and to the left angle as indicated by an arrow 141, this angle of air flow position being produced when the outer housing motor and the inner housing motor and directed to move in combination with each other. Combining the upward and downward movement ability of the inner housing 102 motivated by the outer housing motor, with the left to right and right to left movement ability of the vent slats motivated by the inner housing motor affords air flow direction to cover the entire range from 12 o'clock being center upward to 1 o'clock, 2 o'clock, 3 o'clock, 6 o'clock being center downward all the way around the "dial" until back to 12 o'clock.

Figure 31:
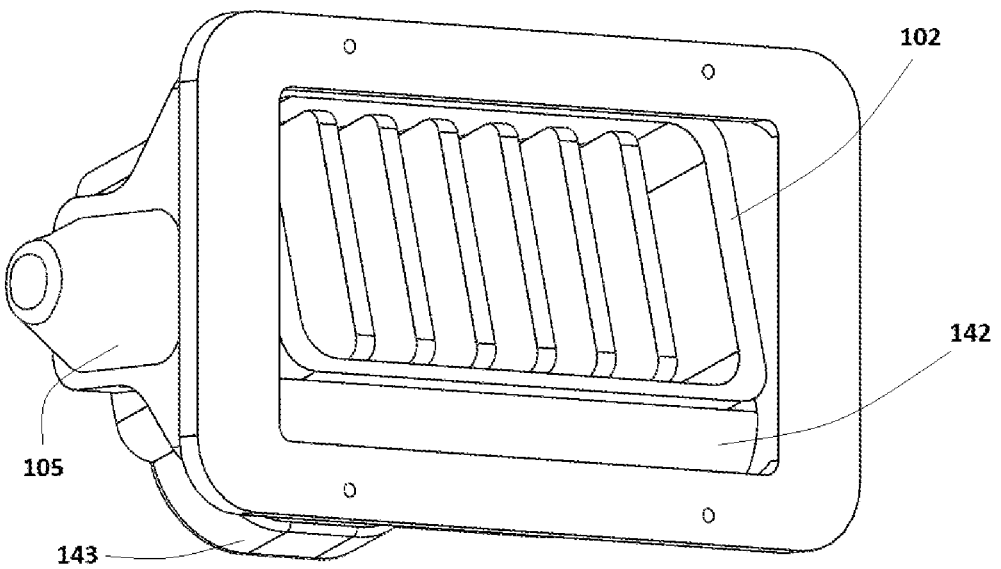
FIG. 31 In slightly offset front view detailing a side motor cover, a bottom motor cover and a partition that covers the components that move the vent slats from left to right.

FIG. 31 Detailed in an off-center angle, the current embodiment showing an outer housing motor cover 105, an inner housing motor cover 143, and a pivot arms cover 142.

Figure 32:
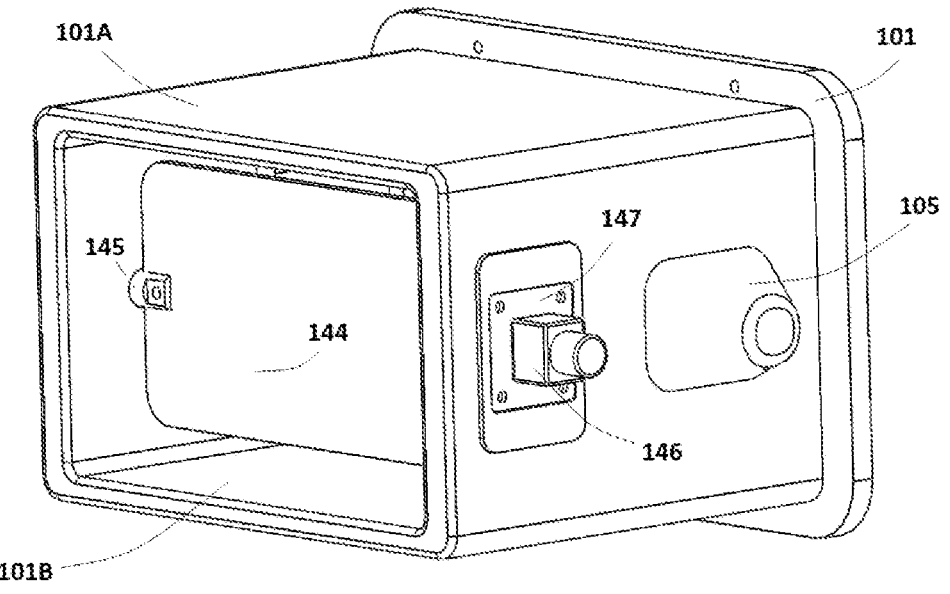
FIG. 32 Another embodiment in ¾ side rear view detailing a third rotational motor and an airflow volume control flap.

FIG. 32 In another embodiment the inner housing 102 has an extended air intake neck 102A, the extended length utilized for an air flow volume flap 144 residing inside the extended neck area 102B of the inner housing 102. An air flow flap 144 rotationally controlled by a rotational motor 146 mounted to the inner housing by a motor plate 147. The air flow volume flap 144 shown in the closed position restricting all air flow through the vent assembly.

Figure 33:
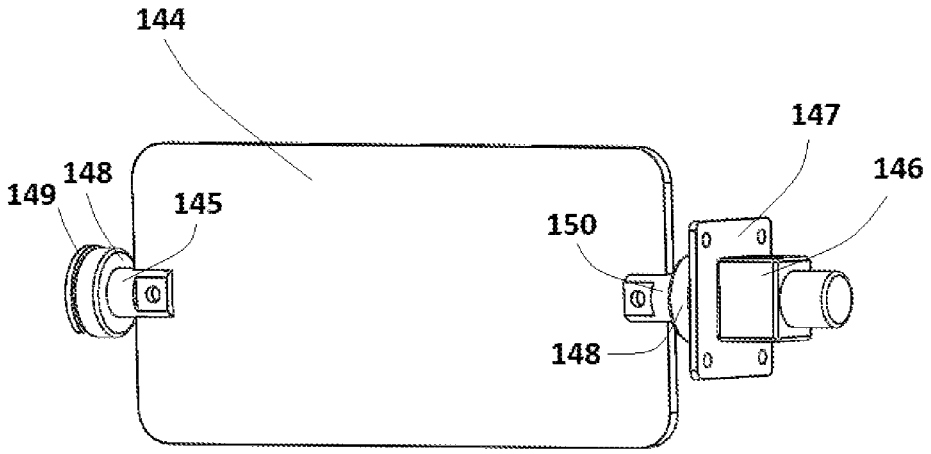
FIG. 33 The same embodiment as FIG. 32 with only the airflow volume control flap and the components required to rotate the flap. The flap in the same closed position as in FIG. 32.

FIG. 33 Showing the same as FIG. 32 with every component removed except the air volume flap and the components directly required to facilitate the flaps rotation. The air flow volume flap 144 secured on one side to an air flap pivot post 145 which rotates within a bearing 148, the bearing 148 being secured within the inner housing by a retaining clip 149. The air flap 144 is secured opposite the pivot post 145 to a motor shaft post 150 which also connects to the inner housing rotational motor's 146 drive shaft. The motor shaft post 150 rotates within the bearing 148 which is also secured within the inner housing by a retaining clip. The rotational motor 146 is secured to the motor plate 147 before the motor plate is secured to the side of the inner housing 102. The air flow volume flap 144 is shown in the closed position restricting air flow into the vent.

Figure 34:
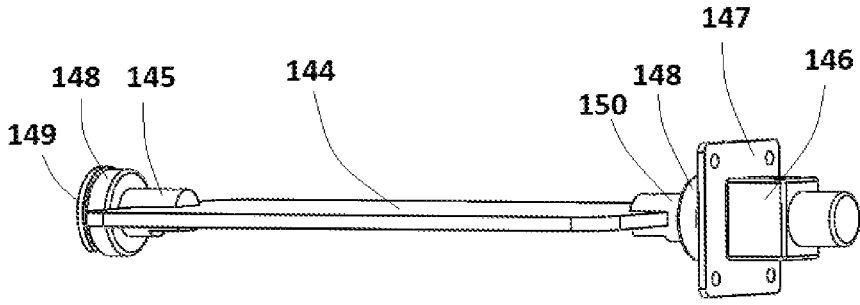
FIG. 34 The same embodiment as FIG. 32 with only the airflow volume control flap and the components required to rotate the flap. The flap in the open position as in FIG. 35.

FIG. 34 Similar to FIG. 33 the single difference being the air flow volume flap 144 is shown in the open position allow full air flow through the vent. Directions sent to the rotational motor 146 by a control device allow a multitude of angles the air flow volume flap can be opened or closed thereby controlling the amount of air flow through the vent assembly providing the desired outcome for the user.

Figure 35:
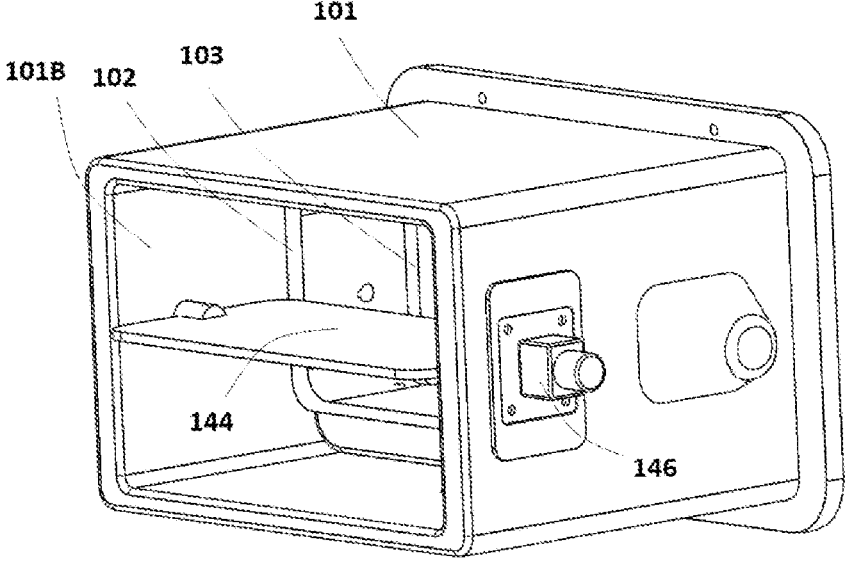
FIG. 35 Shown as in FIG. 32 except the airflow volume flap is in the open position.

FIG. 35 Similar to FIG. 32 the single difference being the air flow volume flap 144 is shown in the open position allow full air flow through the vent assembly. Directions sent to the rotational motor 146 by a control device allow a multitude of angles the air flow volume flap can be opened or closed thereby controlling the amount of air flow through the vent assembly providing the desired outcome for the user.

Figure 36:
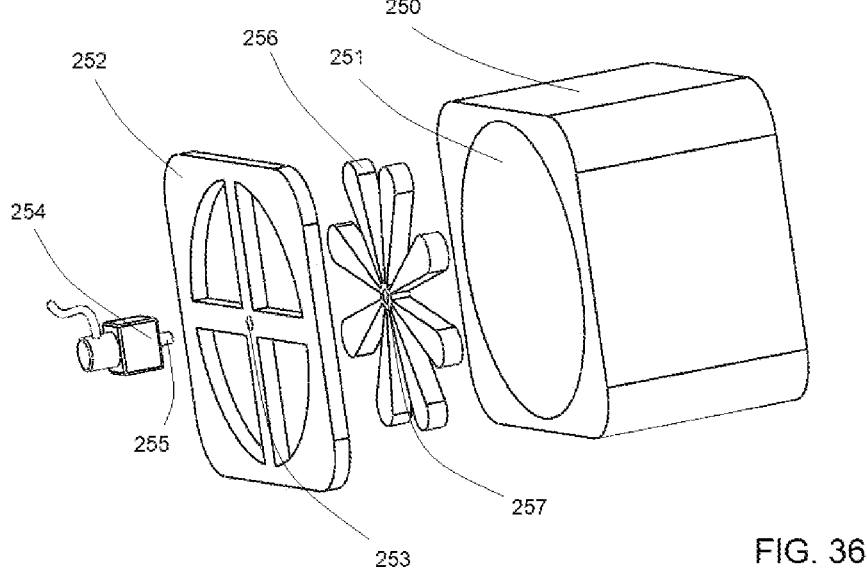
FIG. 36 An exploded side view of the fan assembly.

FIG. 36 In 3/4 view detailing a fan assembly with the fan housing 250, a pass through area 251, a fan housing mounting plate 252 with center hole 253, motor 254 with center shaft 255, a fan blade 256 with center mounting hole 257 for mounting on the motor center shaft 255.

Figure 37:
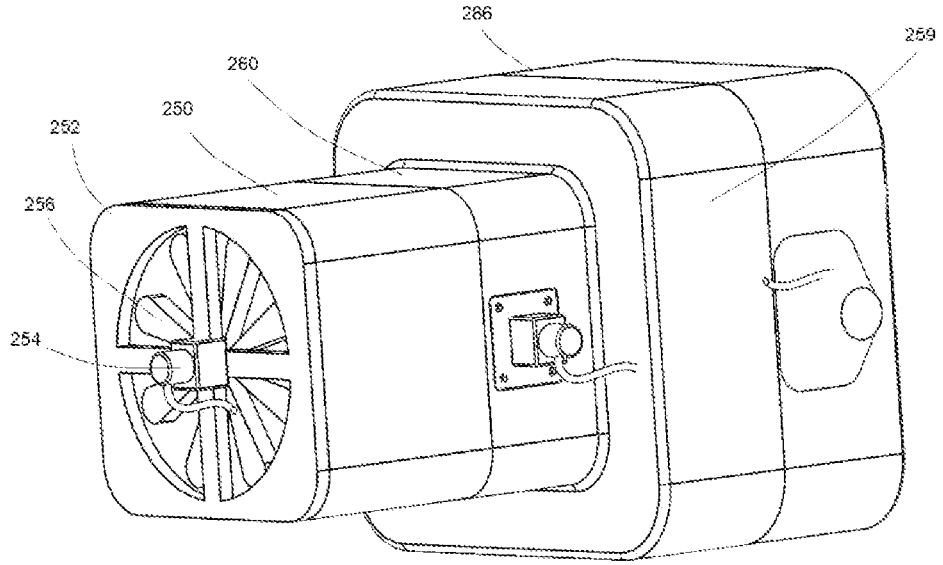
FIG. 37 A side/rear view of the vent assembly with the fan assembly included.

FIG. 37 The vent assembly 286 in this embodiment with the fan assembly secured to the protruding portion 260 of the rear housing 259 of the main vent assembly which houses the volume control flap. The fan housing 250 attached to the protruding portion 260 by way of screws, bolts, or being an integrated extension of the protruding portion 260, the fan housing mounting plate 252 secured to the fan housing 250, the motor 254 and fan blade 256 secured to each other through the fan housing mounting plate 252.

Figure 38:
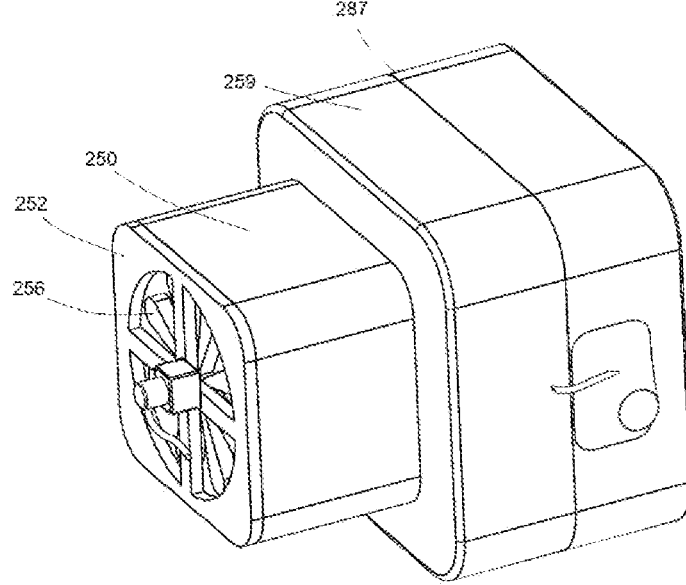
FIG. 38 A top/rear/side view of the vent assembly without the volume control flap portion and with the fan assembly.

FIG. 38 In another embodiment the main vent assembly 287 shown without the protruding portion 260 that held the volume control flap. The fan housing 250 attached directly to the rear housing 259, fan blade 256 is secured within the fan housing mounting plate 252.

Figure 39:
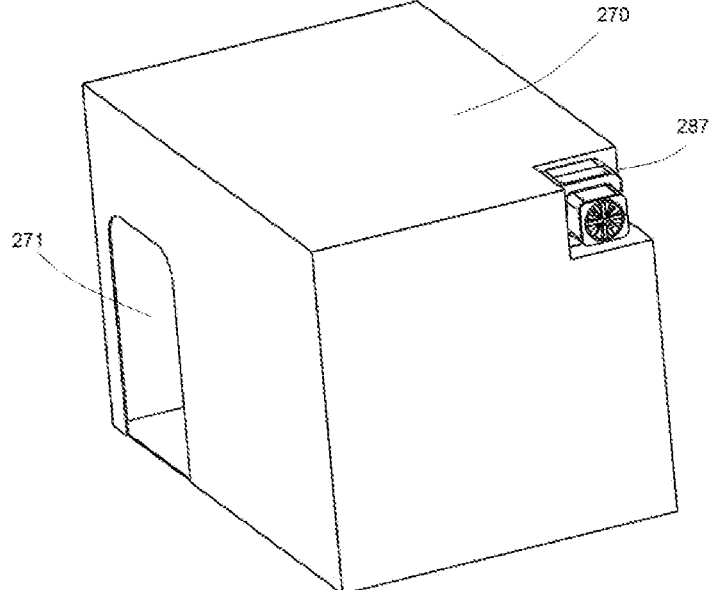
FIG. 39 A ¾ view of a dog house with the vent/fan assembly installed.

FIG. 39 In 3/4 view showing a dog house 270 with entry area 271 with the current embodiment 287 installed in the upper corner to circulate air inside the dog house moving the hotter air out.

Figure 40:
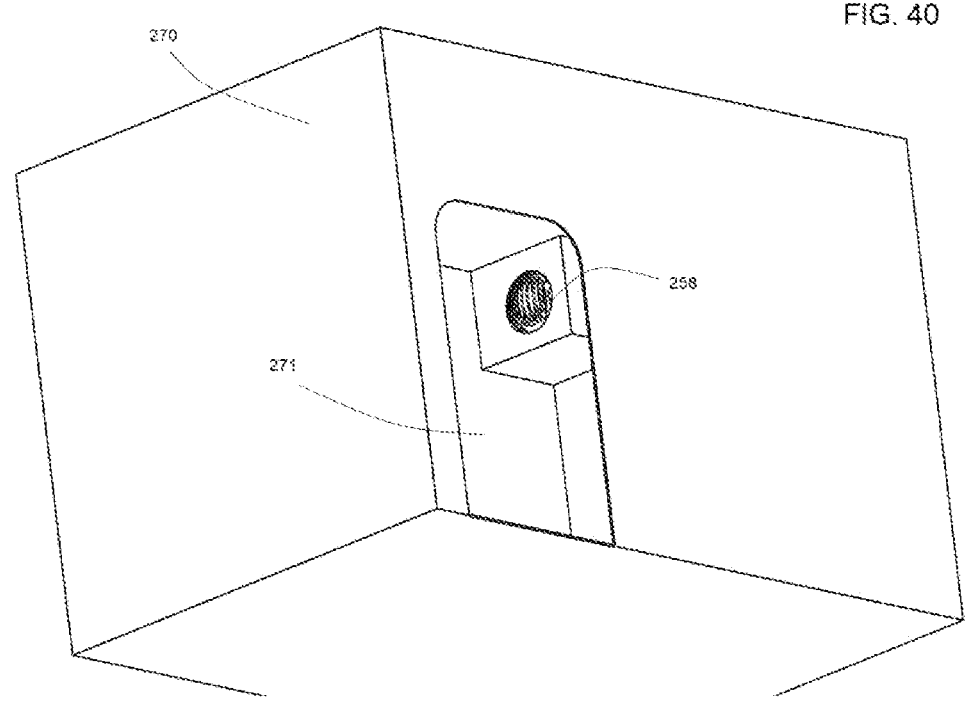
FIG. 40 A ¾ view showing the interior of the dog house through the entry with the vent/fan assembly mounted in the upper corner.

FIG. 40 Shown in front bottom 34 view of the dog house 270, the air directing vent ball 258 of the vent assembly 287, visible through the interior entry 271 of the dog house.

Figure 41:
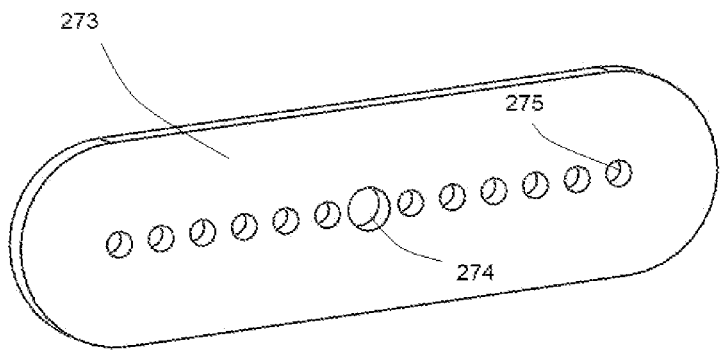
FIG. 41 Angled view of the blue tooth module

FIG. 41 Showing the blue tooth module 273 with wireless sensor 274 and a plurality of temperature sensor 275.

Figure 42:
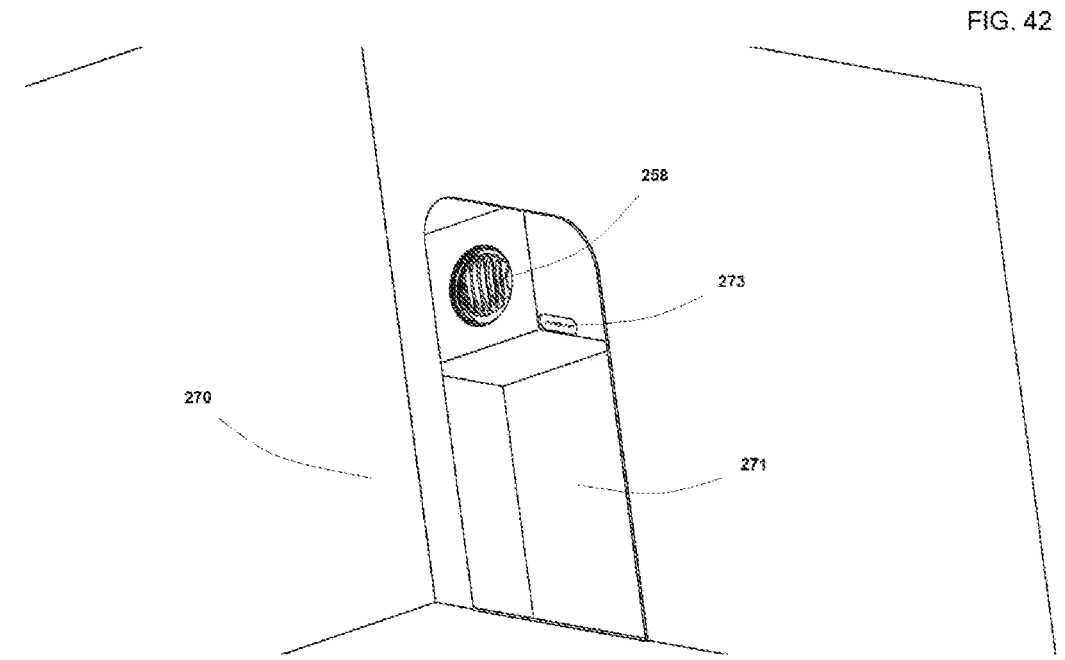
FIG. 42 A ¾ view showing the interior of the dog house through the entry with the vent/fan assembly mounted in the upper corner and the blue tooth module mounting.
Figure 50:
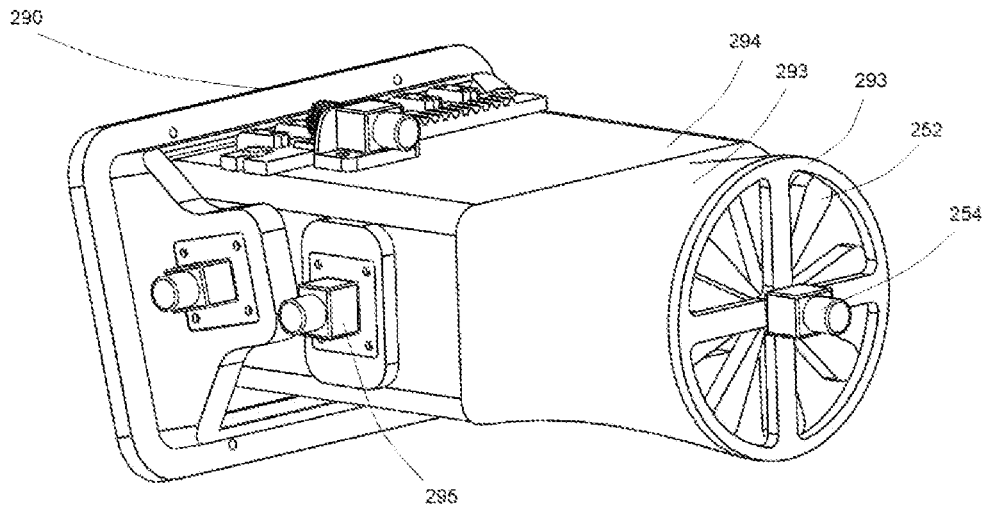
FIG. 50 A ¾ rear/side view of the rectangular shaped embodiment of the vent assembly that includes the air flow volume control flap.

FIG. 42 Detailing the same views as FIG. 50 with the addition of the mounted blue tooth module 273 which allows the pet owner to check the temperature inside the dog house and if desired to turn on the fan and further to direct the angle of the air flow.

Figure 43:
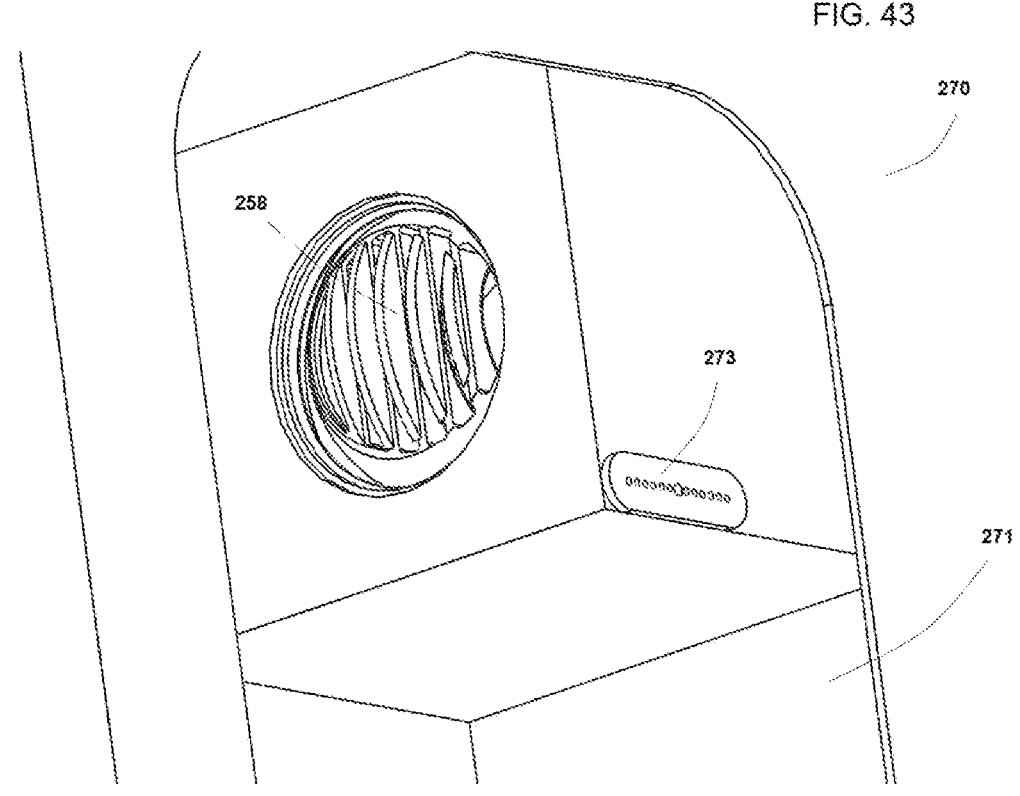
FIG. 43 A closeup view of FIG. 52.

FIG. 43 Detailing a close up view of FIG. 52.

Figure 44:
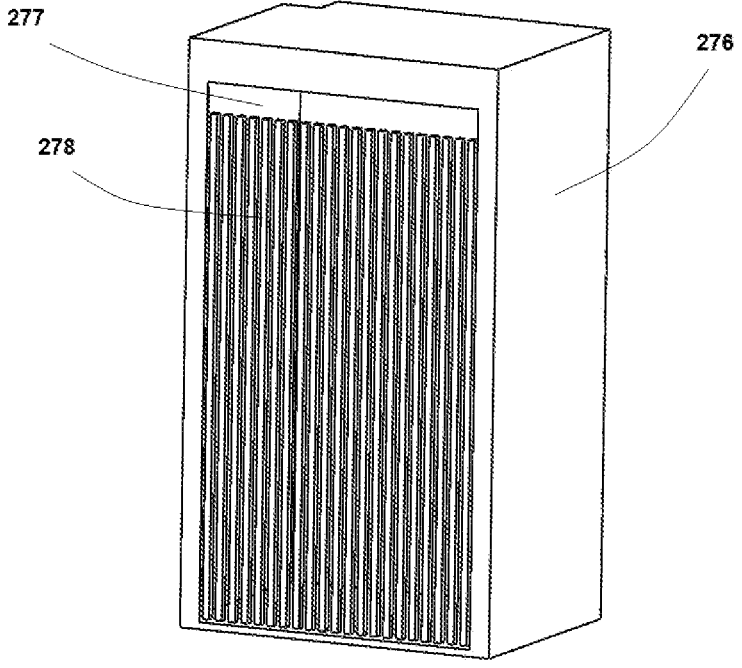
FIG. 44 A ¾ view of a shower stall isolated with shower door.

FIG. 44 In 3/4 top side view is shown a shower stall 276 in isolation with door 278.

Figure 45:
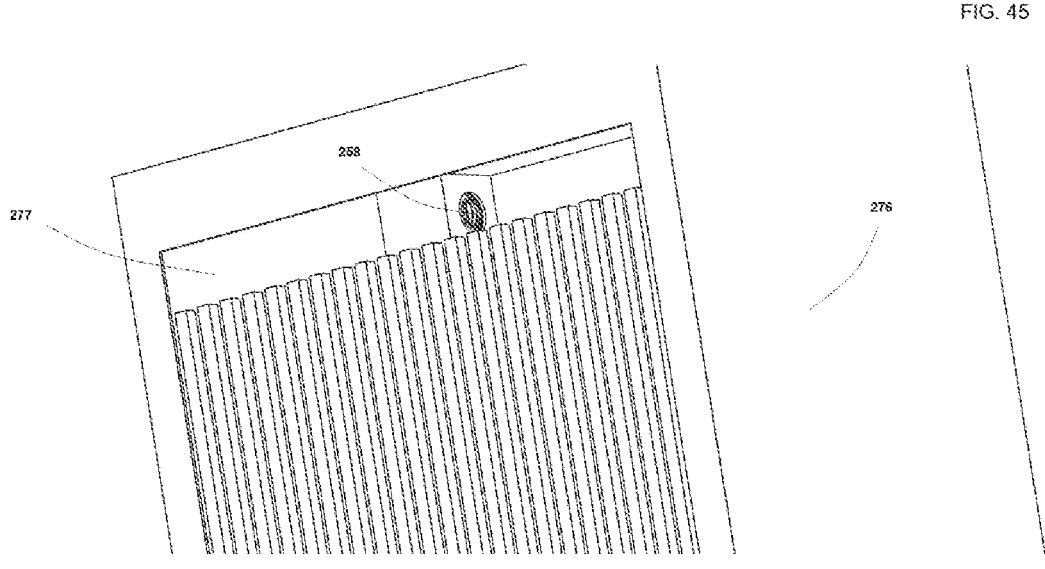
FIG. 45 An interior view of the shower stall detailing the vent/fan assembly mounted in the upper corner.

FIG. 45 Angled to show the interior 277 of the shower stall 276 and noting the air directing vent ball 258 of the vent assembly 287 installed to circulate hot air that accumulates at the top of shower stalls causing moisture to build up and cause damage.

Figure 46:
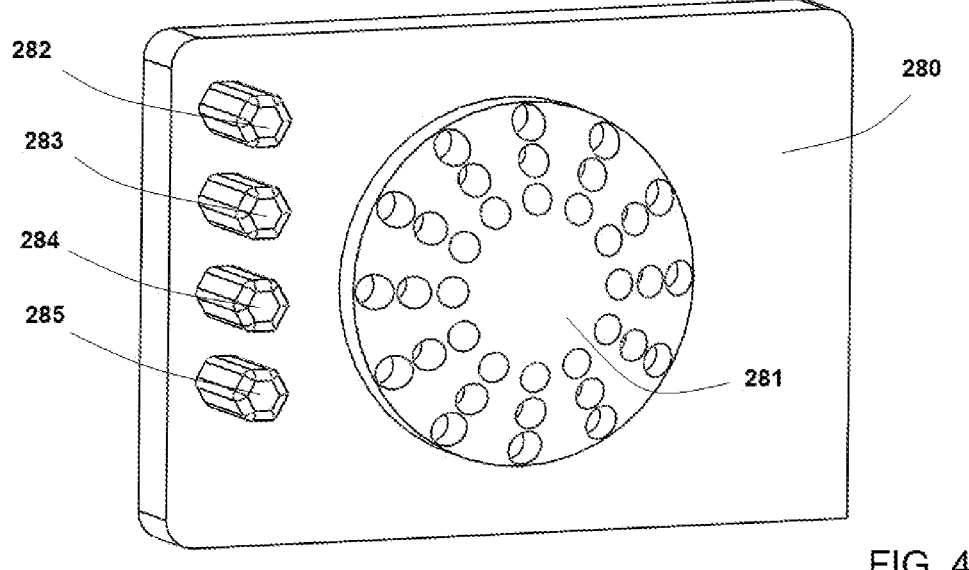
FIG. 46 An angled of the manual control panel with voice control feature.

FIG. 46 Detailing a control panel 280 with a voice actuation module which allows the user to give voice commands to the vent assembly in any embodiment to move the air directing ball in a multitude of directions, and a plurality of controls for left or right movement 282 of the directing air vent, up or down 283 of the directing air vent, increase or decrease 284 of fan speed, and on off control 285, other control options exist such as air flow volume control.

Figure 47:
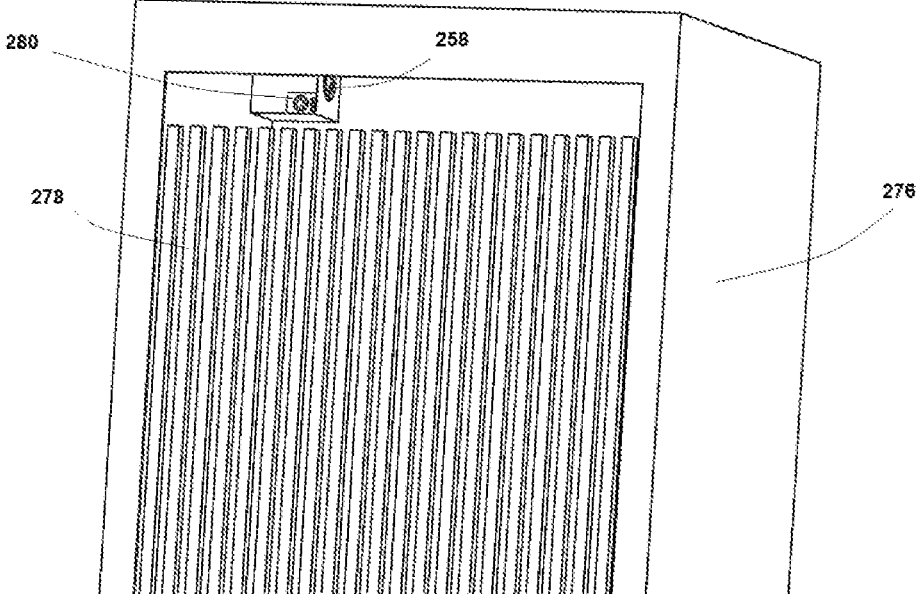
FIG. 47 An interior view of the shower stall detailing the vent/fan assembly mounted in the upper corner with the manual control panel installed.

FIG. 47 Shown in similar view to FIG. 55 the shower stall 276 with shower door 278 and control panel 280 mounted in the upper corner adjacent the vent assembly.

Figure 48:
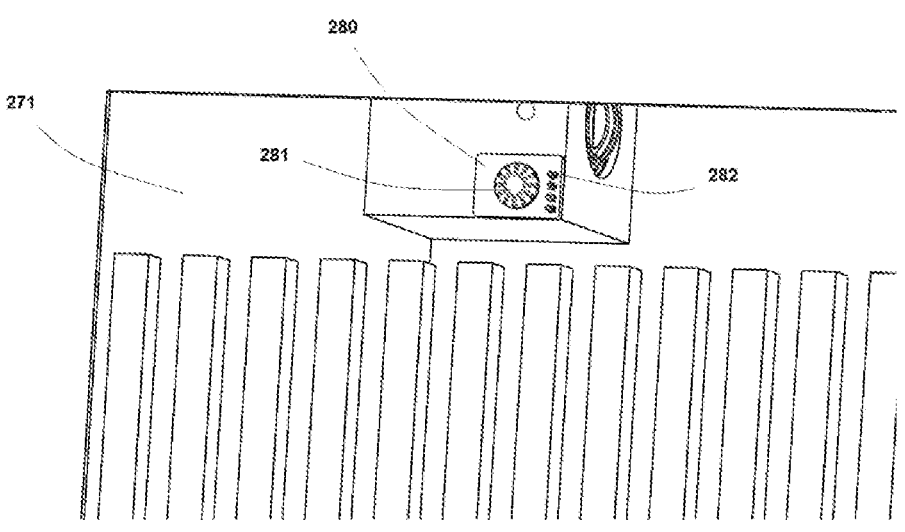
FIG. 48 A close up view of FIG. 57.

FIG. 48 Detailing a close-up view of FIG. 57 the shower interior 271 exposing the control panel 280 with controls 282-285 and the voice activated module 281.

Figure 49:
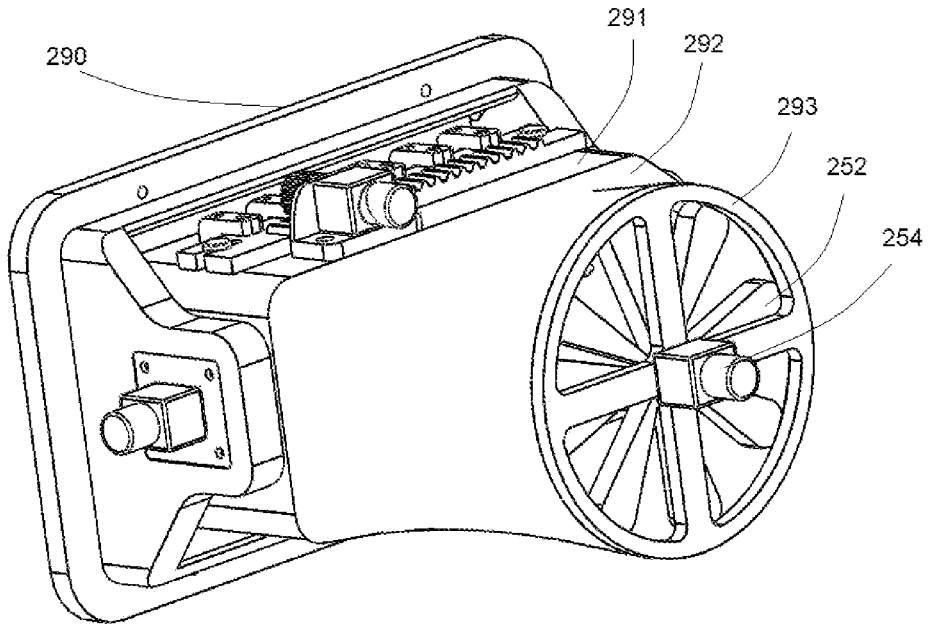
FIG. 49 A ¾ rear/side view of the rectangular shaped embodiment of the vent assembly.

FIG. 49 A 3/4 rear/side view of the rectangular shaped embodiment of the vent assembly 290 having a second housing 291.

FIG. 50 A 3/4 rear/side view of the rectangular shaped embodiment of the vent assembly that includes the air flow volume control flap.

The invention claimed is:

1. An air vent control system comprising:
a single directional air flow component containing a multitude of vertical passages and mounted on a vertical axis an outer first ring housing having an inner surface and an outer surface and a pass through inner space and mounted on a horizontal axis,
a second housing having; an inner surface and an outer surface and a pass through inner space, the single directional air flow component mounted on the vertical axis within the outer first ring housing;
a rotational first motor mounted within the single directional air flow component for rotating the single directional air flow component within the outer first ring housing on the vertical axis directing airflow to an angular position about the vertical axis only,
the outer first ring housing mounted on the horizontal axis within the second housing; a rotational second motor mounted on an outer horizontal wall of the second housing for rotating the outer first ring housing within the second housing about the horizontal axis directing airflow to an angular position about the horizontal axis only,
a main controller for setting the angular position of the single directional air flow component on the vertical axis, and for setting the angular position of the outer first ring housing on the horizontal axis, wherein the respective positions of the single directional air flow component relative to the outer first ring housing and the outer first ring housing relative to the second housing selectively regulate the direction of airflow discharged through the air vent control system across a myriad of angular positions across the combined vertical and horizontal axis, the main controller operated by manually inputted commands or by voice commands.

2. An air vent control system as claimed in claim 1 wherein the air flow direction is regulated by the single directional air flow component, the rotational first motor mounted inside the single directional air flow component rotates the single directional air flow component by adjusting the position of the single directional air flow component within the sidewalls of the outer first ring housing.

3. An air vent control system as claimed in claim 1 wherein the single air flow directional component is pivotally mounted on the vertical axis, the vertical axis is controlled by the rotational first motor which is connected to a motor driveshaft, the rotational first motor rotating the motor drive shaft so as to position the single air flow directional component based on information provided by the main controller.

4. An air vent control system as claimed in claim 1 wherein the single air flow directional component is pivotally mounted on the vertical axis, the vertical axis is controlled by the rotational first motor connected to the motor driveshaft so as to position the single air flow directional component about the vertical axis, the outer first ring housing is pivotally mounted on the horizontal axis, the horizontal axis is controlled by the rotational second motor connected to the motor driveshaft so as to position the outer first ring housing about the horizontal axis, both rotational motor's positions directed by information provided by the main controller.

5. An air vent control system as claimed in claim 1 wherein the rotational first motor and the rotational second motor are activated and operate substantially simultaneously to move the single directional air flow component within the outer first ring housing and the outer first ring housing within the second housing each to a selected position using the most direct path.

6. An air vent control system as claimed in claim 1 comprising;
the directional air flow component mounted on a vertical or horizontal axis within a first housing that directs the flow of air across a range of angles;
a second housing having side walls defining an inner space, the first housing being mounted within the inner space of the second housing on an axis opposite the directional air flow component's mounting axis allowing the first housing to pivot in a range of angles; a first motor for moving the directional air flow component to an angular position about its axis contained within the first housing; a second motor for pivoting the first housing about its axis contained within the second housing;
a third motor for pivoting the air flow volume flap controlling the amount of air passing through the vent, a front opening and a rear opening, wherein air flow direction through the vent is from the rear opening to the front opening;
a main controller for setting the angular position of the directional air flow component on the vertical axis, and for setting the angular position of the first housing on the horizontal axis, wherein the respective positions of the directional air flow component relative to the first housing and the first housing relative to the second housing selectively regulate the direction of airflow discharged through the vent, the main controller additionally setting the volume of airflow discharged through the vent.

7. An air vent control system as claimed in claim 1 wherein the second housing contains;
an extended air intake neck being utilized for accommodating an air flow volume flap, and having a pocket and through hole in each inner wall of the extended air intake neck on a horizontal axis,
an air volume control flap contained within the extended air intake neck of the second housing on the horizontal axis, a rotational third motor mounted on an outer horizontal wall of the extended air intake neck of the second housing connected to the air flow volume flap and controlling the amount of air passing through the vent as directed by the main controller.

8. An air vent control system comprising; a plurality of directional air flow components mounted on a vertical axis, a first housing having an inner surface and an outer surface and a pass through inner space which define a substantially rectangular shape, and mounted on a horizontal axis, a second housing having an inner surface and an outer surface and a pass through inner space which define a substantially rectangular shape, and a mounting flange with a
plurality of mounting holes, a mechanical system containing a motor, a plurality of pivot arms, and a single gear and mounted upon the outer surface of the first housing for directing the angle of the plurality of directional air flow components and the direction of the air flow from left to right and right to left,
the plurality of directional air flow components being mounted within the first housing on the vertical axis,
the first housing mounted within the second housing on the horizontal axis,
a first rotational motor attached to the first housing, supporting the single gear which moves a gear rack laterally left and laterally right rotating the plurality of directional air flow components left and right,
a second rotational motor attached to the second housing rotating the first housing on the horizontal axis across a wide range of upward and downward angles,
a main controller for setting the angular position of the plurality of directional air flow components on the vertical axis, and for setting the angular position of the first housing on the horizontal axis, wherein the respective positions of the plurality of directional air flow components relative to the first housing and the first housing relative to, the second housing selectively regulate the direction of airflow discharged through the air vent control system across a myriad of angular positions across the combined vertical and horizontal axis, the main controller operated by manually inputted commands or by voice commands.

9. Air vent control system as claimed in claim 8 comprising;
a third rotational motor for pivoting an air flow volume flap controlling the amount of air passing through the vent, a front opening and a rear opening, wherein air flow direction through the vent is from the rear opening to the front opening, the main controller setting the volume of airflow discharged through the vent.

10. An air vent control system as claimed in claim 1 further comprising an air volume control flap movable by way of a third motor and selectively positioned according to directions received from the main controller, the air flow volume control flap comprises a flat plate like structure connected at its ends to an air flap pivot post and a motor shaft post, the third motor operating the motor shaft post which is rotated thereby so as to move and adjust the air flow volume control flap through a multitude of positions between a first closed position in which airflow is prevented, and a second open position in which airflow is fully facilitated.

11. As claimed in claim 1 further comprising a fan housing extending from the second housing with a pass through interior space aligning with the interior pass through space of the second housing, a face plate secured at the outer end of the extended fan housing for mounting a motor, the motor controlled by the main controller, and a fan blade attached to a center shaft of the motor, when activated by the main controller the motor rotates the fan blade drawing air into and through the vent assembly in a directed manner.

12. As claimed in claim 8 further comprising a fan housing extending from the second housing with a pass through interior space aligning with the interior pass through space of the second housing, a face plate secured at the outer end of the extended fan housing for mounting a motor, the motor controlled by the main controller, and a fan blade attached to a center shaft of the motor, when activated by the main controller the motor rotates the fan blade drawing air into and through the vent assembly in a directed manner.

13. As claimed in claim 9 further comprising a fan housing extending from the second housing with a pass through interior space aligning with the interior pass through space of the second housing, a face plate secured at the outer end of the extended fan housing for mounting a motor, the motor controlled by the main controller, and a fan blade attached to a center shaft of the motor, when activated by the main controller the motor rotates the fan blade drawing air into and through the vent assembly in a directed manner.

14. As claimed in claim 7 further comprising a further extension of the extended air intake neck portion of the second housing with a pass through interior space aligning with the extended air intake neck portion, a face plate secured at the outer end of the further extension portion for mounting a motor, the motor controlled by the main controller, and a fan blade attached to the center shaft of the motor that when activated by the main controller rotates drawing air into and through the vent assembly in a directed manner.

15. As claimed in claim 1 the main controller further comprising a plurality of switches for on/off function, up/down function of the directional vent, left/right function of the directional vent, and adjusting fan speed function, additionally the main controller houses a voice control module allowing a user to direct the up/down and left/right of the directional vent as well as adjusting the fan speed by using voice commands.

16. As claimed in claim 15 the main controller further comprising a blue tooth activated sensor module which reads temperature and allows the user to remotely activate the main controller, set fan speed within the vent assembly, and adjust the direction of the air passing through the vent assembly.

\* \* \* \* \*